US010670498B2

(12) United States Patent
Mita et al.

(10) Patent No.: US 10,670,498 B2
(45) Date of Patent: Jun. 2, 2020

(54) RISK ASSESSMENT DEVICE, RISK ASSESSMENT METHOD, AND RISK ASSESSMENT PROGRAM

(71) Applicant: TLV Co., Ltd., Kakogawa-shi (JP)

(72) Inventors: Tetsuya Mita, Kakogawa (JP); Guoxian Hou, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 0 days.

(21) Appl. No.: 16/495,862

(22) PCT Filed: Feb. 14, 2018

(86) PCT No.: PCT/JP2018/005025
§ 371 (c)(1),
(2) Date: Sep. 20, 2019

(87) PCT Pub. No.: WO2018/179937
PCT Pub. Date: Oct. 4, 2018

(65) Prior Publication Data
US 2020/0056964 A1      Feb. 20, 2020

(30) Foreign Application Priority Data

Mar. 30, 2017  (JP) .................................. 2017-068528

(51) Int. Cl.
*G06F 11/30*   (2006.01)
*G01M 99/00*   (2011.01)
*G06F 16/23*   (2019.01)

(52) U.S. Cl.
CPC ....... *G01M 99/008* (2013.01); *G06F 16/2379* (2019.01)

(58) Field of Classification Search
CPC .................................................. G01M 99/008
See application file for complete search history.

(56) References Cited

U.S. PATENT DOCUMENTS

2005/0149570 A1    7/2005  Sasaki et al.
2017/0024267 A1*   1/2017  Ihara .................. G05B 23/0283

FOREIGN PATENT DOCUMENTS

DE         10310116 A1     9/2003
JP        2007328522   *  12/2007

(Continued)

*Primary Examiner* — Phuong Huynh
(74) *Attorney, Agent, or Firm* — The Webb Law Firm

(57) ABSTRACT

A risk assessment device includes a parameter storage unit that calculates, based on data for calculation, one or more parameters for calculating a target malfunction curve and stores the calculated parameters, the parameters relating to piping system-related items, the data for calculation being stored in a storage unit in which the piping system-related items and a number of years passed before malfunction are stored as the data for calculation with respect to each of a plurality of process devices; a calculation condition acquisition unit that acquires the piping system-related items with respect to a target process device; a parameter acquisition unit that acquires a calculation parameter for obtaining the target malfunction curve based on the piping system-related items acquired with respect to the target process device and the stored parameters; and a malfunction curve calculation unit that calculates the target malfunction curve based on the calculation parameter.

9 Claims, 8 Drawing Sheets

(56) References Cited

FOREIGN PATENT DOCUMENTS

| JP | 2007328522 A | | 12/2007 |
|----|--------------|---|---------|
| JP | 2008293106 | * | 12/2008 |
| JP | 2008293106 A | | 12/2008 |
| JP | 2016115008 A | | 6/2016 |

* cited by examiner

RISK ASSESSMENT DEVICE, RISK ASSESSMENT METHOD, AND RISK ASSESSMENT PROGRAM

CROSS-REFERENCE TO RELATED APPLICATIONS

This application is the United States national phase of International Application No. PCT/JP2018/005025 filed Feb. 14, 2018, and claims priority to Japanese Patent Application No. 2017-068528 filed Mar. 30, 2017, the disclosures of which are hereby incorporated by reference in their entirety.

TECHNICAL FIELD

The present disclosure relates to a risk assessment device, a risk assessment method, and a risk assessment program for calculating the probability that a process device that is provided in a piping system of a steam plant will malfunction.

BACKGROUND ART

In recent years, risk assessment using the technique of risk-based inspection (RBI) that takes risks into consideration is performed in large facilities such as petrochemical plants and thermal power plants (it should be noted that an assessment technique based on RBI is standardized as API581 by the American Petroleum Institute (API)). As a risk assessment means of this type, JP 5884000B (Patent Document 1) discloses creating a plot diagram by plotting, with respect to each process device that is provided in a steam plant, a pair of the probability of malfunction and the degree of influence of malfunction, on a risk matrix in which the probability of malfunction and the degree of influence are set as two axes, and performing risk assessment of the target plant using the plot diagram.

DISCLOSURE OF THE INVENTION

Problem to be Solved by the Invention

However, in the above-described conventional risk assessment means, the probability of malfunction of each process device is calculated using a common technique of RBI, and characteristics of process devices that are provided in a piping system of the steam plant are not taken into consideration.

Therefore, it is desirable to realize a risk assessment device, a risk assessment method, and a risk assessment program that can calculate the probability of malfunction in the light of characteristics of process devices that are provided in a piping system of a steam plant.

Means for Solving Problem

A risk assessment device according to the present disclosure is a risk assessment device for calculating a probability of malfunction of a process device that is provided in a piping system of a steam plant, the risk assessment device including:
a target malfunction curve calculation unit configured to calculate a target malfunction curve that shows a change of the probability of malfunction over time with respect to a target process device; and
a malfunction probability calculation unit configured to calculate the probability of malfunction of the target process device based on the calculated target malfunction curve,
wherein the target malfunction curve calculation unit includes:
a parameter storage unit that calculates, based on data for calculation, one or more parameters for calculating the target malfunction curve and stores the calculated parameters, the parameters relating to piping system-related items, the data for calculation being stored in a storage unit in which the piping system-related items and the number of years passed before malfunction are stored as the data for calculation with respect to each of a large number of process devices, and the piping system-related items relating to a piping system in which the process device is provided;
a calculation condition acquisition unit that acquires the piping system-related items with respect to the target process device;
a parameter acquisition unit that acquires a calculation parameter for obtaining the target malfunction curve based on the piping system-related items acquired with respect to the target process device and the parameters stored in the parameter storage unit; and
a malfunction curve calculation unit that calculates the target malfunction curve based on the calculation parameter.

According to this configuration, the probability of malfunction is calculated using a malfunction curve that is based on parameters calculated using data regarding a large number of process devices, and, in the above configuration, the parameters that are calculated relate to the piping system-related items that directly relate to the way the process device is used and largely affect the probability of malfunction, and therefore the probability of malfunction according to characteristics of the process device can be obtained. Since not all information regarding the process device, but rather objective items relating to the piping system and not relating to the circumstances of the process device itself are used, the same type of data can be easily collected and it is possible to effectively increase the accuracy of calculated parameters.

The following describes preferable aspects of a monitoring device according to the present disclosure. However, the scope of the present disclosure is not limited by the following preferable aspects.

In one aspect, it is preferable that the parameter storage unit calculates the parameters by performing survival time analysis based on the piping system-related items and the number of years passed before malfunction of each process device, and assessing influence of the piping system-related items on the number of years passed before malfunction.

According to this configuration, the degree of influence exerted by the piping system-related items until the process device malfunctions can be properly assessed through the survival time analysis, and the parameters can be used accurately.

In one aspect, it is preferable that the piping system-related items include an item that relates to a usage state of the piping system.

The usage state of the piping system is a factor that largely affects the degree of a load applied to the process device provided in the piping system, and therefore, if the usage state is taken into consideration as a piping system-related item according to this configuration, the parameters can be used accurately.

In one aspect, it is preferable that the calculation condition acquisition unit also acquires device-related items that relate to the target process device itself, the target malfunction curve calculation unit includes: a correction method storage unit that stores a correction method that corresponds to the device-related items; and a parameter correction unit that corrects the calculation parameter acquired by the parameter acquisition unit based on the correction method corresponding to the acquired device-related items, and the malfunction curve calculation unit calculates the target malfunction curve based on the calculation parameter corrected by the parameter correction unit.

According to this configuration, the parameter determined based on the piping system-related items, which are objective items regarding the process device, is further corrected based on the device-related items, which are subjective items relating to the process device itself, and therefore the accuracy of the parameter can be effectively increased.

In one aspect, it is preferable that the device-related items include an item that relates to an additional configuration that is provided to the target process device.

In one aspect, it is preferable that the device-related items include either or both of an item that relates to an installation state of the target process device in relation to the piping system and an item that relates to performance of the target process device in relation to the piping system.

An additional configuration provided to the process device, whether or not the process device is properly installed, and the performance of the process device largely affect the durability of the process device against malfunction, and therefore, if the parameter is corrected taking these into consideration according to this configuration, the accuracy of the parameter can be effectively increased.

In one aspect, it is preferable that the calculation condition acquisition unit also acquires operation-related items that relate to operations performed on the target process device, the target malfunction curve calculation unit includes a malfunction curve correction unit that corrects, based on the operation-related items, the target malfunction curve calculated by the malfunction curve calculation unit, and the malfunction probability calculation unit calculates the probability of malfunction of the target process device based on the target malfunction curve corrected by the malfunction curve correction unit.

Operations performed on the process device largely affect the durability of the process device against malfunction, and therefore, if the malfunction curve is corrected taking the operations into consideration according to this configuration, the accuracy of the malfunction curve can be effectively increased.

An additional configuration provided to the process device, whether or not the process device is properly installed, the performance of the process device, and operations performed on the process device largely affect the durability of the process device against malfunction, and therefore, if the parameter is corrected taking these into consideration according to this configuration, the accuracy of the parameter can be effectively increased.

In one aspect, it is preferable that, with respect to the target process device, the target malfunction curve calculation unit calculates a target malfunction curve for each type of malfunction, and the malfunction probability calculation unit calculates the probability of malfunction of the target process device for each type of malfunction based on the calculated target malfunction curve.

According to this configuration, the probability of malfunction is calculated for each type of malfunction, and therefore risk assessment can be performed more accurately.

A risk assessment method according to the present disclosure is a risk assessment method for causing a computer to calculate a probability of malfunction of a process device that is provided in a piping system of a steam plant, the risk assessment method including:
  a target malfunction curve calculation step of calculating a target malfunction curve that shows a change of the probability of malfunction over time with respect to a target process device; and
  a malfunction probability calculation step of calculating the probability of malfunction of the target process device based on the calculated target malfunction curve,
  wherein the target malfunction curve calculation step includes:
    a parameter storing step of calculating, based on data for calculation, one or more parameters for calculating the target malfunction curve and storing the calculated parameters, the parameters relating to piping system-related items, the data for calculation being stored in a storage unit in which the piping system-related items and the number of years passed before malfunction are stored as the data for calculation with respect to each of a large number of process devices, and the piping system-related items relating to a piping system in which the process device is provided;
    a calculation condition acquisition step of acquiring the piping system-related items with respect to the target process device;
    a parameter acquisition step of acquiring a calculation parameter for obtaining the target malfunction curve based on the piping system-related items acquired with respect to the target process device and the parameters stored in the parameter storage step; and
    a malfunction curve calculation step of calculating the target malfunction curve based on the calculation parameter.

A risk assessment program according to the present disclosure is a risk assessment program for causing a computer to calculate a probability of malfunction of a process device that is provided in a piping system of a steam plant, the risk assessment program causing the computer to realize:
  a target malfunction curve calculation function of calculating a target malfunction curve that shows a change of the probability of malfunction over time with respect to a target process device; and
  a malfunction probability calculation function of calculating the probability of malfunction of the target process device based on the calculated target malfunction curve,
  wherein the target malfunction curve calculation function causes the computer to realize:
    a parameter storing function of calculating, based on data for calculation, one or more parameters for calculating the target malfunction curve and storing the calculated parameters, the parameters relating to piping system-related items, the data for calculation being stored in a storage unit in which the piping system-related items and the number of years passed before malfunction are stored as the data for calculation with respect to each of a large number of process devices, and the piping system-related items relating to a piping system in which the process device is provided;

a calculation condition acquisition function of acquiring the piping system-related items with respect to the target process device;

a parameter acquisition function of acquiring a calculation parameter for obtaining the target malfunction curve based on the piping system-related items acquired with respect to the target process device and the parameters stored by the parameter storage function; and a malfunction curve calculation function of calculating the target malfunction curve based on the calculation parameter.

According to these configurations, functions and effects similar to those achieved by the above-described risk assessment device can be achieved.

BEST MODE FOR CARRYING OUT THE INVENTION

Figure 1:
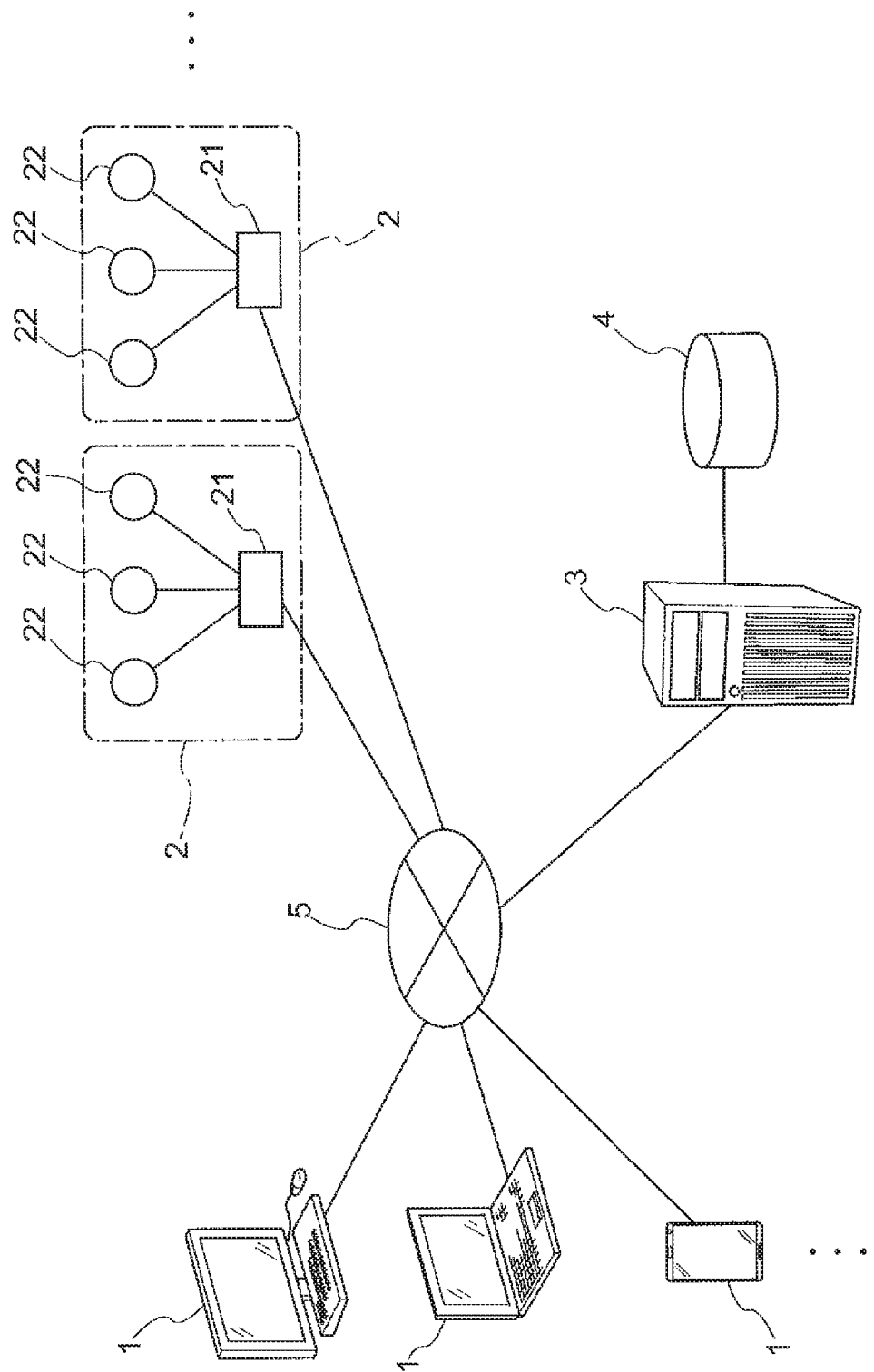
FIG. 1 is a schematic configuration diagram of a plant monitoring system according to this embodiment.

The following describes an embodiment of a risk assessment device, a risk assessment method, and a risk assessment program according to the present disclosure with reference to the accompanying drawings. The following describes an example in which the risk assessment device according to this embodiment is incorporated into a plant monitoring system that monitors a steam plant 2 that utilizes steam, such as a petrochemical plant or a thermal power plant. First, as shown in FIG. 1, in the plant monitoring system according to this embodiment, a monitoring server 3 collects data via a network 5 from various steam plants 2 to be monitored, and accumulatively stores the collected data in an external database server 4. The monitoring server 3 is configured to perform analysis and/or determination based on the collected data and/or data stored in the database server 4 periodically or in response to an instruction from a user and/or an administrator, and the result of the analysis and/or the determination is transmitted to a user terminal 1 such as a PC or a smartphone, or the user accesses the monitoring server 3 via the user terminal 1, and thus the user is informed of the state of the steam plant 2. Further, the result of the analysis and/or the determination is stored in the database server 4 and is used for further analysis and/or determination. It should be noted that, in this embodiment, a "piping system" is a concept that includes a whole steam system that is constituted by, for example, a steam trap, steam piping, various valves, and the like. If such a whole steam system is considered as one of the important assets, the risk assessment device, the risk assessment method, and the risk assessment program according to this embodiment can be applied as one of the asset management techniques.

One example of data that is collected by the monitoring server 3 will be described. A monitoring device 21 is configured to collect, from each constituent element group 22 of the steam plant 2, sensor data (pressure, electrical current value, vibration, ultrasonic waves, temperature, rotational speed of a device, etc.) that is obtained by sensors that are attached to respective constituent elements constituting the constituent element group 22 and/or obtained through inspection performed using a portable inspection device, event data that relates to events (start and stop of operation, occurrence of malfunction and the type thereof, maintenance such as repair or replacement of a device, etc.) that occurred in the constituent elements, and the like, and transmit the collected data to the monitoring server 3 periodically or continuously. Examples of constituent elements of the steam plant 2 include a steam-utilizing device that utilizes steam, such as a turbine, a compressor, a heat exchanger, or the like, a piping system such as a feeding pipe for feeding steam to the steam-utilizing device or a drain pipe for discharging drainage generated in the steam-utilizing device, and process devices that are provided in the piping system, such as a steam trap, a control valve, a pump, a filter, a separator, and the like. Data (the above-described sensor data, event data, etc.) regarding these constituent elements are collected by the monitoring device 21, and each data piece is periodically transmitted to the monitoring server 3 together with identification information given to the corresponding constituent element and time.

That is, for each steam plant 2 to be monitored, the monitoring server 3 collects data that indicates, with respect to each constituent element of the steam plant 2, transition of a sensor value, whether or not the constituent element is in operation, the time when malfunction occurred, the type of occurred malfunction, and the time when maintenance was performed. As a result of the collected data being accumulatively stored in the database server 4, information, such as transition of a sensor value, the type of occurred malfunction, the number of years passed before malfunction, whether or not maintenance was performed, and when and how many times maintenance was performed, is stored in the database server 4 for each constituent element that has ever been used in the steam plant 2.

Figure 9:
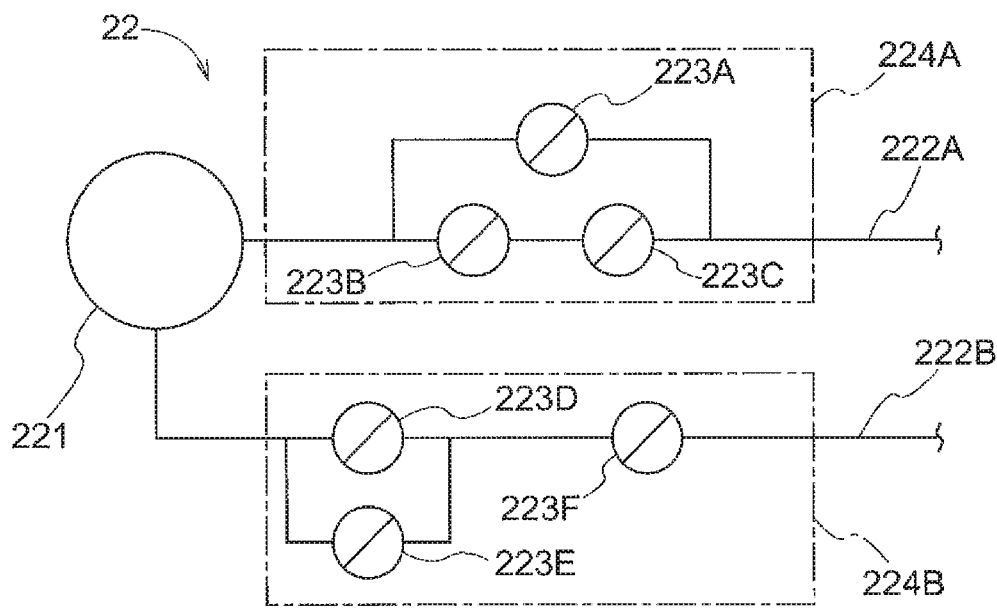
FIG. 9 is a schematic diagram showing one example of a steam-utilizing device group.

More specifically, the database server 4 accumulatively stores, in association with identification information regarding each constituent element, the above-described data; information (corresponding to piping system-related items described later) that relates to a piping system in which the constituent element is provided; information (corresponding to device-related items described later) that relates to the constituent element itself such as the type of the constituent element (in the case of a steam trap, a float type, a mechanical type, a thermostatic type, a thermodynamic type, etc.), its performance, the number of years from installation, an additional configuration provided to the constituent element, and the like; and information (corresponding to operation-related items described later) that relates to operations that have been performed on a process device. It is necessary to collectively deal with a group of devices that are associated with each other, for example, a process device group (224A or 224B in FIG. 9) that is constituted by a piping system and a plurality of process devices that are provided in the piping system, such as steam traps 223A to 223C (or 223D to 223F) that are provided in the same piping 222A (or 222B) as shown in FIG. 9, or a steam-utilizing device group that is constituted by a steam-utilizing device and a plurality of process device groups that are associated with the steam-utilizing device, such as a constituent element group 22 that is constituted by a steam-utilizing device 221 and the steam traps 223A to 223F that are provided in the piping 222A and 222B connected to the steam-utilizing device. Therefore, in the database server 4, identification information is given not only to individual constituent elements but also to each device group such as a process device group or a steam-utilizing device group, and the database server also stores, together with identification information regarding a process device group and/or a steam-utilizing device group, identification information regarding each constituent element that constitutes the process device group and/or the steam-utilizing device group, the arrangement relationship between constituent elements that constitute the target device group, and the like. Since the amount of thus collected data is enormous, the database server 4 that is external to the monitoring server 3 is used in this embodiment to store the data. It should be noted that the configuration of the database server 4 is not specifically limited, and a server device that is connected to the monitoring server 3 either by wire or wirelessly, or a cloud server in a cloud environment may be used.

In this embodiment, the monitoring server 3 is configured to be capable of assessing risks inherent in the target steam plant 2, using not only data regarding the steam plant 2 but also data accumulated in the database server 4 regarding each constituent element that has ever been used. Specifically, in risk assessment, information regarding a device group to be assessed is accepted from a user, the probability of malfunction and the degree of influence of malfunction are calculated with respect to the device group, the calculated probability of malfunction and the calculated degree of influence are plotted on a risk matrix in which the probability of malfunction and the degree of influence of malfunction are set as two axes and that is used as an assessment technique of RBI, and the result of plotting is provided to the user. Based on the risk matrix, the user can recognize risks inherent in constituent elements to be assessed, and performs risk assessment of the steam plant 2. The following describes configurations provided in the monitoring server 3 to perform the risk assessment.

First, the monitoring server 3 is a common server device and includes common hardware configurations such as a communication interface for performing communication via the network 5, an input/output device for directly inputting data to and outputting data from the server device, a CPU that controls each unit of the server device, a HDD that is a large-capacity storage device storing various kinds of data and programs, a memory that temporarily stores a program to be executed, and the like. In this embodiment, a risk assessment program for performing processing described later is stored in the HDD, and as a result of the risk assessment program, which is temporarily stored in the memory, being executed by the CPU, respective units of the monitoring server 3 function as a risk assessment device that includes functional units shown in FIGS. 2 to 6.

Figure 2:
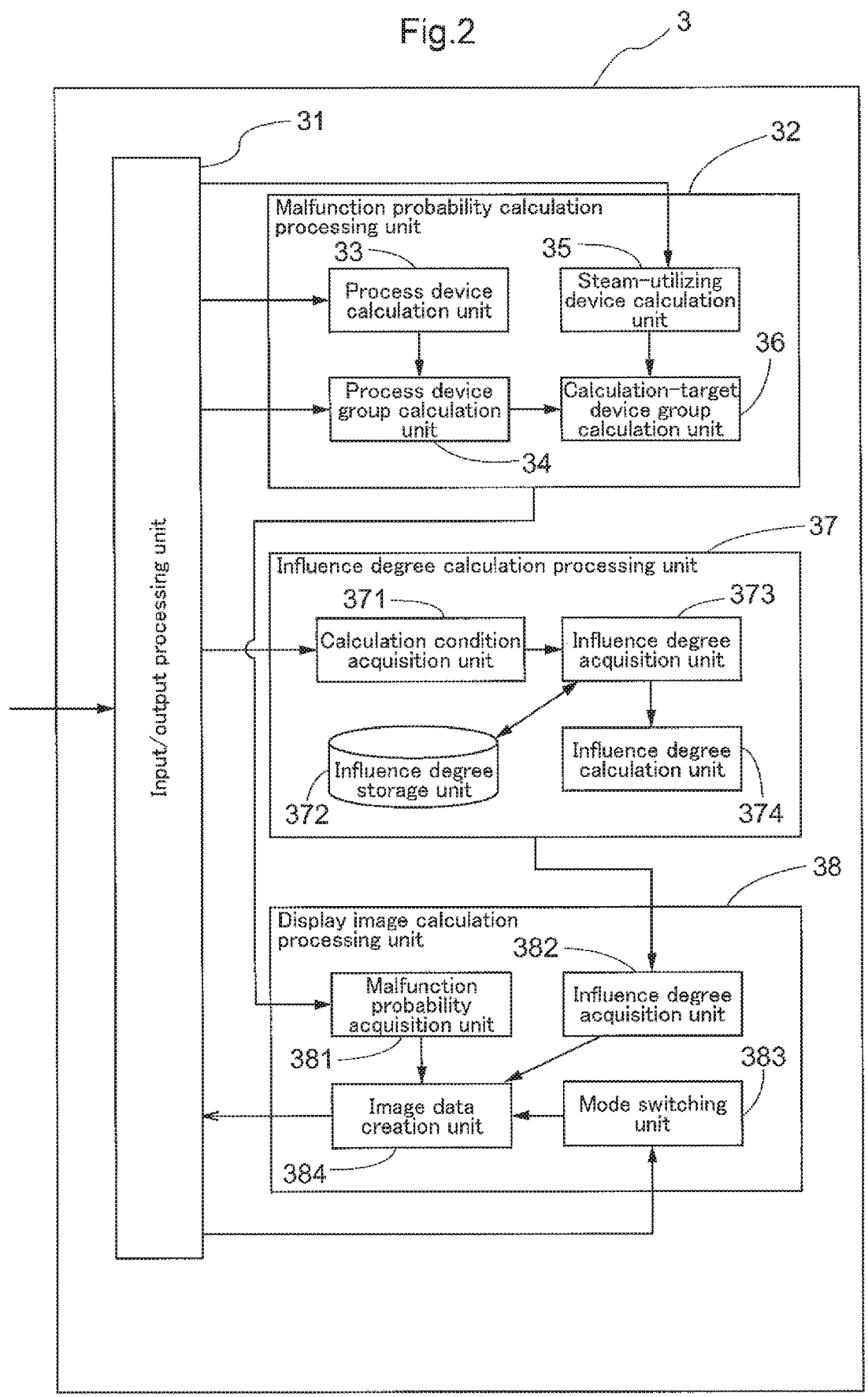
FIG. 2 is a block diagram of a risk assessment device.

Specifically, in this embodiment, as a result of the risk assessment program being executed, the monitoring server 3 is configured as the risk assessment device that includes, as functional units, an input/output processing unit 31 that accepts a request from the user and transmits an assessment result to the user, a malfunction probability calculation processing unit 32 that calculates the probability of malfunction of a target device group, an influence degree calculation processing unit 37 that calculates the degree of influence of the target device group, and a display image calculation processing unit 38 that creates image data to be provided to the user, based on the calculated probability of malfunction and the calculated degree of influence (FIG. 2). The following describes respective functional units.

First, the input/output processing unit 31 functions as an interface of the risk assessment device. Specifically, the input/output processing unit is configured to accept a request from the user and provide, to respective functional units, an instruction for causing the functional units to perform processing according to the request together with information that is included in the accepted request and is necessary to perform the processing in the functional units, and the input/output processing unit is also configured to output image data that is created by the display image calculation processing unit 38 to the user. Examples of information included in the request from the user include identification information regarding the device group to be assessed, additional information regarding the target device group, the point in time for which the probability of malfunction is to be calculated (for example, only the current point in time or future points in time over several years), and information that indicates what kind of risk matrix is to be displayed.

As shown in FIG. 2, the malfunction probability calculation processing unit 32 includes a process device calculation unit 33 that calculates the probability of malfunction of each process device that is included in the target device group (steam-utilizing device group or the like), a process device group calculation unit 34 that calculates the probability of malfunction of each process device group that is included in the target device group, based on the probability of malfunction of each process device calculated by the process device calculation unit 33, a steam-utilizing device calculation unit 35 that calculates the probability of malfunction of a steam-utilizing device that is included in the target device group, and a calculation-target device group calculation unit 36 that calculates the probability of malfunction of the target device group based on the probability of malfunction of each process device group calculated by the process device group calculation unit 34 and the probability of malfunction calculated by the steam-utilizing device calculation unit 35.

Figure 3:
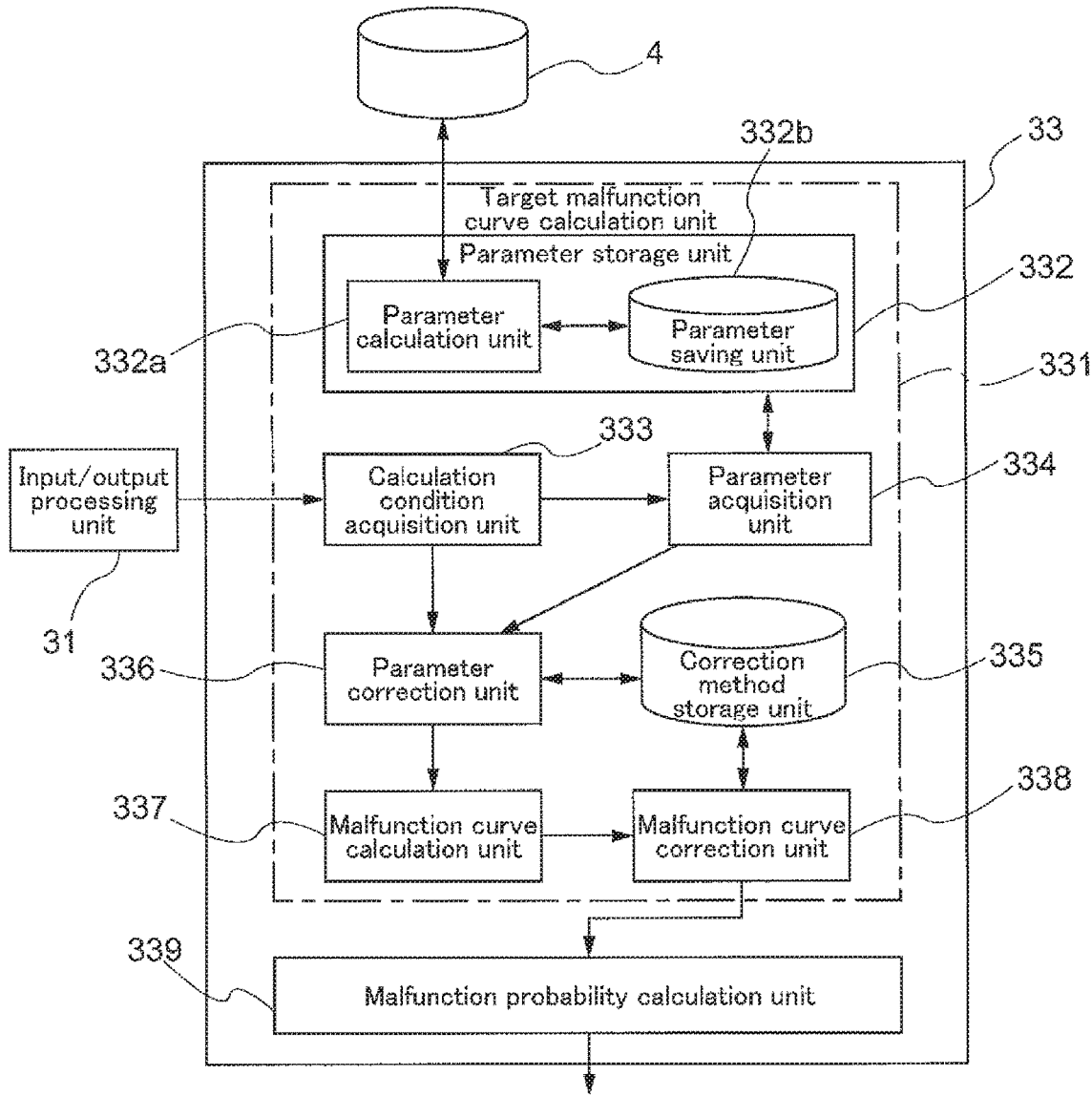
FIG. 3 is a block diagram of a process device calculation unit.

As shown in FIG. 3, the process device calculation unit 33 includes a target malfunction curve calculation unit 331 that calculates a target malfunction curve that shows a change of the probability of malfunction over time with respect to a target process device, and a malfunction probability calculation unit 339 that calculates the probability of malfunction of the target process device based on the calculated target malfunction curve, and the process device calculation unit is configured to calculate, for each process device, a malfunction curve based on a predetermined model and a parameter of the model, which parameter is determined according to individual process devices, and calculate the probability of malfunction based on the malfunction curve.

In order to calculate the target malfunction curve, the target malfunction curve calculation unit 331 includes a parameter storage unit 332, a calculation condition acquisition unit 333, a parameter acquisition unit 334, a correction method storage unit 335, a parameter correction unit 336, a malfunction curve calculation unit 337, and a malfunction curve correction unit 338, and is configured to determine parameters according to each process device for which calculation is to be performed and calculate the target malfunction curve based on the parameters.

The parameter storage unit 332 calculates parameters for calculating the target malfunction curve based on data for calculation that is stored in the database server 4, and stores the calculated parameters. More specifically, the parameter storage unit calculates and stores, with respect to each type of the process device, one or more parameters relating to piping system-related items that are items relating to a piping system in which the process device is provided. For this purpose, the parameter storage unit 332 includes a parameter calculation unit 332a that calculates parameters and a parameter saving unit 332b that saves the calculated parameters.

In order to calculate parameters, first, the parameter calculation unit 332a acquires data from the database server 4. As described above, the database server 4 stores various kinds of information regarding a large number of process devices by collecting and storing information regarding each constituent element of each steam plant 2, and stores, with respect to each of the large number of process devices, the type of the process device, the piping system-related items relating to a piping system in which the process device is provided, and the number of years passed before malfunction, as data for calculation to be used for calculation by the parameter calculation unit 332a. In this embodiment, items that relate to the usage state of the piping system are used as installation-related items, and specifically, items such as the application of the piping system (for example, whether it is used for feeding steam to a steam-utilizing device, discharging drainage generated in the steam-utilizing device, or tracing), the pressure of steam flowing through the piping system, the pipe diameter, the steam flow pattern (whether steam flows intermittently, whether the flow rate changes over time, etc.), and the like are used as items relating to the usage state. Further, the numbers of years passed before malfunction are classified according to the type of malfunction, and the parameter calculation unit 332a is configured to acquire, for each type of malfunction, the type of the process device, the piping system-related items, and the number of years passed before malfunction.

The parameter calculation unit 332a acquires the above-described data for calculation from the database server 4, and assesses, for each type of the process device, the degree of influence of each piping system-related item on the number of years passed before malfunction, with respect to each type of malfunction, and determines parameters by expressing the degrees of influence of respective piping system-related items in numerical form. For example, out of the piping system-related items, as for the application of the piping system or the steam flow pattern, parameters that correspond to respective applications and respective flow patterns are determined, and as for the pressure of steam flowing through the piping system or the pipe diameter, a plurality of levels (large, medium, and small, for example) are set for the pressure or diameter, and parameters that correspond to respective levels are determined. It should be noted that parameters can be calculated based on the data for calculation using various statistical techniques such as a statistical classification algorithm, regression analysis, survival time analysis, and the like. In this embodiment, the parameter calculation unit 332a uses, as one example, survival time analysis to calculate parameters, and calculates the parameters by performing the survival time analysis based on the piping system-related items and the number of years passed before malfunction of each process device, which are included in the data for calculation, using each piping system-related item as a covariate, and assessing the influence of the piping system-related items on the number of years passed before malfunction. Various models can be used in the survival time analysis, such as a proportional hazard model, a Weibull distribution model, and the like.

In the parameter saving unit 332b, parameters that correspond to respective piping system-related items and are determined by the parameter calculation unit 332a are saved as parameters for calculation of the malfunction curve, for each type of the process device and each type of malfunction. That is, one or more parameters corresponding to respective piping system-related items are saved in the parameter saving unit 332b, with respect to each type of the process device and for each type of malfunction.

The calculation condition acquisition unit 333 acquires, with respect to the target process device, the type of the process device, the piping system-related items, device-related items described later, and operation-related items described later. In this embodiment, the calculation condition acquisition unit 333 is configured to acquire identification information regarding the target device group from the input/output processing unit 31 and acquire, with respect to each process device that is included in the device group corresponding to the acquired identification information, the type of the process device, the piping system-related items, the device-related items described later, and the operation-related items described later from the database server 4. Also, the calculation condition acquisition unit 333 is configured to acquire the number of years from installation of each process device from the database server 4, and acquire calculation time information regarding the point in time for which a target malfunction probability is to be calculated (for example, whether the probability of malfunction at the current point in time is to be calculated or the probabilities of malfunction over a plurality of years from the current point in time are to be calculated) from the input/output processing unit 31. Additionally, if an instruction has been accepted by the input/output processing unit 31 as to the type of malfunction for which the probability is to be calculated, the calculation condition acquisition unit 333 also acquires the type of malfunction for which calculation is to be performed.

The parameter acquisition unit 334 acquires calculation parameters for obtaining the target malfunction curve based on the type and the piping system-related items that are acquired with respect to the target process device and parameters stored in the parameter storage unit 332. Thus, parameters according to the target process device are obtained. It should be noted that, if the type of malfunction for which calculation is to be performed is acquired by the calculation condition acquisition unit 333, the parameter acquisition unit 334 acquires calculation parameters according to the acquired type of malfunction, and if the type of malfunction is not acquired by the calculation condition acquisition unit 333, the parameter acquisition unit 334 acquires calculation parameters for all types of malfunction. The parameter acquisition unit 334 may merely acquire, as the calculation parameters, parameters that correspond to the piping system-related items from the parameter storage unit 332 or calculate the calculation parameters based on the acquired parameters.

The correction method storage unit 335 stores correction methods that correspond to the device-related items that relate to the process device itself and the operation-related items that relate to operations performed on the process device. That is, the parameters acquired by the parameter acquisition unit 334 are based on the piping system-related items and do not reflect the actual circumstances of individual process devices such as the performance (capacity or the like) of the individual process devices and additional configurations (a sensor, a protection cover, the material that is used, etc.) provided to the individual process devices. Therefore, in order to correct parameters stored in the parameter storage unit 332 and/or a malfunction curve that is calculated based on the parameters, according to the device-related items and/or the operation-related items that indicate the circumstances specific to the target process device, the correction method storage unit 335 stores correction methods that correspond to respective device-related items and respective operation-related items.

Examples of the device-related items include items that relate to additional configurations provided to the target process device (the presence or absence of a sensor, a protection cover, or a device that automatically performs repair, the material used, etc.) and items that relate to the installation state and performance of the process device (surrounding environment, whether the process device is installed where a water hammer is likely to occur, whether the process device is not properly attached, the capacity, etc.), and examples of the operation-related items include whether or not the process device has been repaired, when the process device was repaired, the type of repair, the degree of effect of repair, and the like. As described above, the calculation condition acquisition unit 333 is configured to acquire the device-related items and the operation-related items with respect to each target process device. Although the correction methods are not specifically limited, the calculation parameters are corrected using an appropriate calculation method (for example, by multiplying or dividing) based on values corresponding to respective device-related items, and the malfunction curve is corrected according to a predetermined calculation procedure using, as the starting point, the point in time at which an operation was performed, for example.

Figure 8:
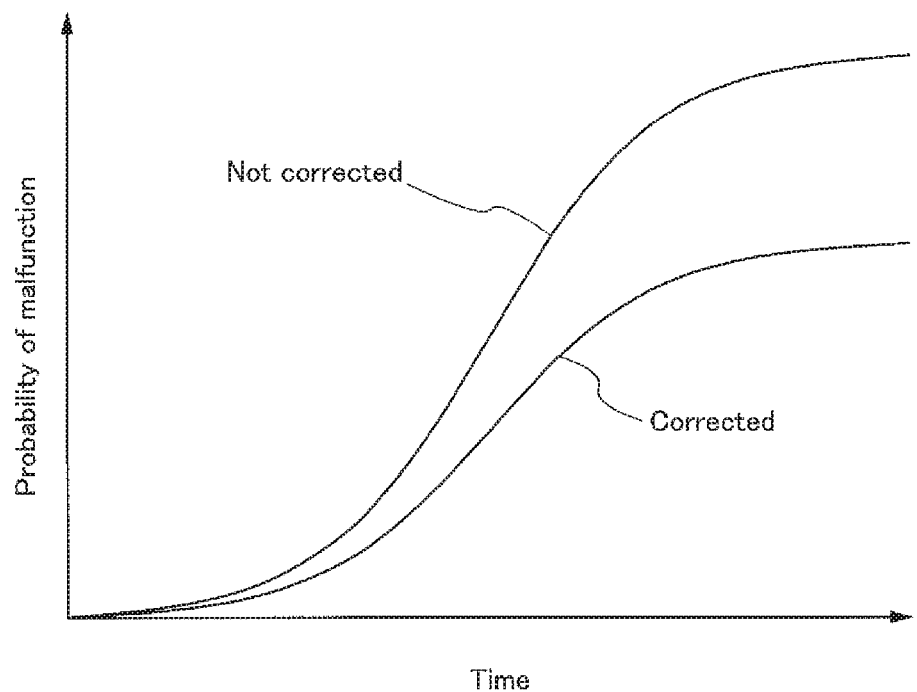
FIG. 8 is a graph showing one example of the influence exerted on a malfunction curve when parameters are corrected.

The parameter correction unit 336 acquires a correction method that corresponds to the acquired device-related items from the correction method storage unit 335, and corrects the calculation parameters acquired by the parameter acquisition unit 334, based on the acquired correction method. That is, the calculation parameters that are determined based on the piping system-related items, which are objective items regarding the process device, are further corrected based on the device-related items, which are subjective items relating to the process device itself, and therefore calculation parameters according to the actual circumstances of individual process devices can be obtained. FIG. 8 shows one example of a case where the calculation parameters are not corrected by the parameter correction unit 336 and a case where the calculation parameters are corrected by the parameter correction unit 336.

Figure 7:
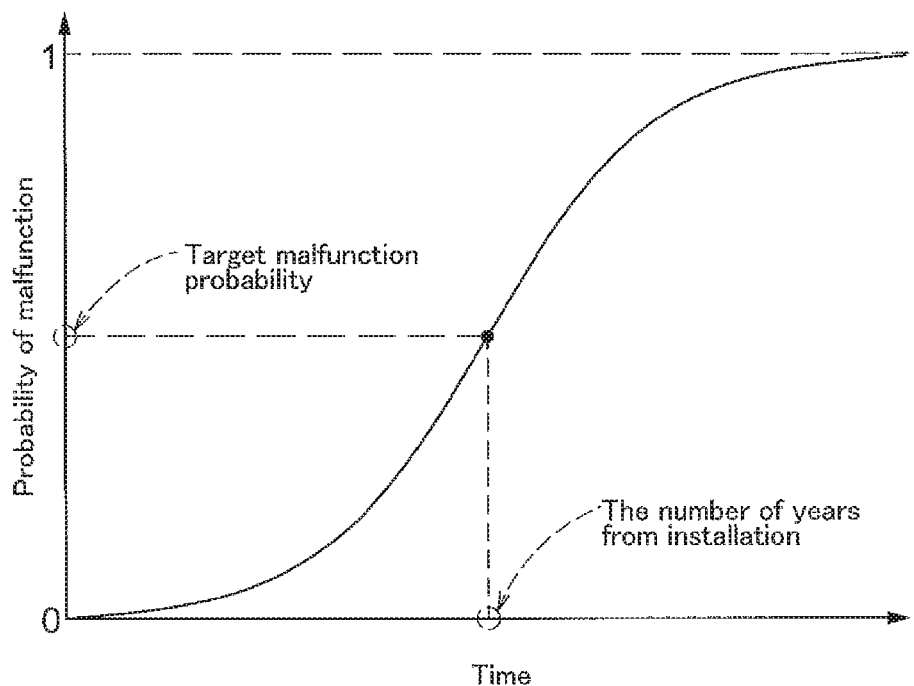
FIG. 7 is a graph showing one example of a malfunction curve that is calculated by the process device calculation unit.

The malfunction curve calculation unit 337 calculates the target malfunction curve as shown in FIG. 7, for example, based on a predetermined model for calculation of the malfunction curve and the corrected calculation parameters.

It should be noted that it is possible to use an appropriate cumulative probability distribution model based on normal distribution, Poisson distribution, Weibull distribution, or the like. In the case where the probability of malfunction is to be calculated for each type of malfunction, the malfunction curve calculation unit 337 calculates the target malfunction curve for each type of malfunction with respect to the target process device.

The malfunction curve correction unit 338 corrects the target malfunction curve calculated by the malfunction curve calculation unit 337, based on the operation-related items relating to operations performed on the process device. Specifically, if the process device has been repaired, the malfunction curve correction unit acquires a correction method that corresponds to the acquired operation-related items from the correction method storage unit 335, and corrects the target malfunction curve calculated by the malfunction curve calculation unit 337, based on the acquired correction method.

The malfunction probability calculation unit 339 calculates the probability of malfunction with respect to each process device based on the target malfunction curve calculated by the malfunction curve calculation unit 337 or the target malfunction curve corrected by the malfunction curve correction unit 338, and the calculation time information acquired by the calculation condition acquisition unit 333. For example, in calculating the probability of malfunction at the current point in time, the malfunction probability calculation unit 339 obtains a probability of malfunction that corresponds to the number of years from installation of the target process device from the target malfunction curve (see FIG. 7). In calculating the probabilities of malfunction over a plurality of years from the current point in time, the malfunction probability calculation unit 339 obtains, from the target malfunction curve, probabilities of malfunction that correspond to respective years, such as one year later and two years later, based on the number of years from installation of the target process device. In the case where the probability of malfunction is to be calculated for each type of malfunction, the malfunction probability calculation unit 339 calculates, with respect to the target process device, the probability of malfunction for each type of malfunction based on target malfunction curves that are calculated for respective types of malfunction.

As described above, in the process device calculation unit 33, the probability of malfunction is calculated with respect to each target process device through execution of:

(1) a parameter storing step of calculating one or more parameters relating to the piping system-related items, for calculation of a target malfunction curve, based on data for calculation stored in the database server 4, and storing the calculated parameters;

(2) a calculation condition acquisition step of acquiring, with respect to the target process device, the type of the process device, the piping system-related items, the device-related items, and the operation-related items;

(3) a parameter acquisition step of acquiring a calculation parameter for obtaining the target malfunction curve, based on the piping system-related items acquired with respect to the target process device and the parameters stored in the parameter storing step;

(4) a parameter correction step of correcting the calculation parameter based on a correction method that corresponds to the acquired device-related items;

(5) a malfunction curve calculation step of calculating the target malfunction curve based on the calculation parameter;

(6) a malfunction curve correction step of correcting the target malfunction curve based on the acquired operation-related items; and (7) a malfunction probability calculation step of calculating the probability of malfunction of the target process device based on the calculated target malfunction curve.

Figure 4:
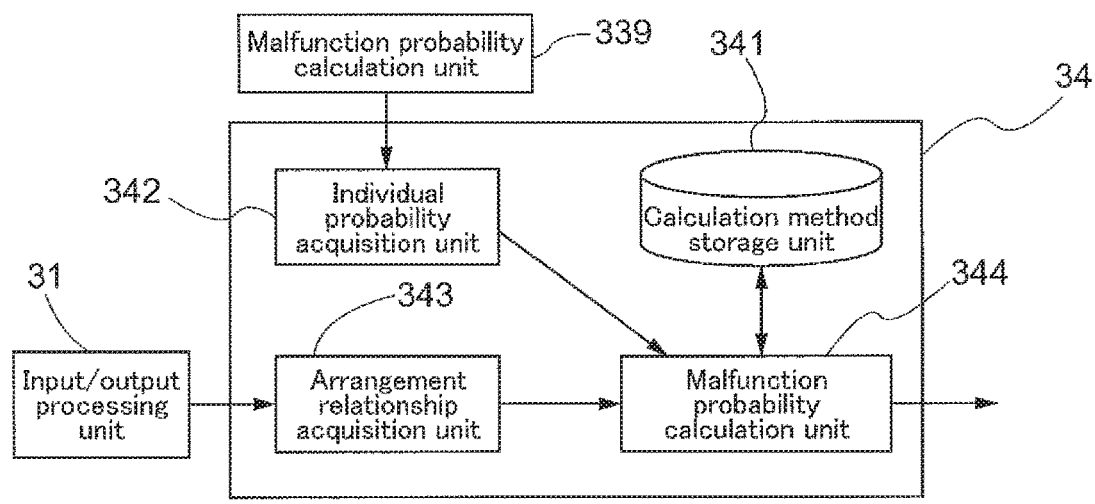
FIG. 4 is a block diagram of a process device group calculation unit.

The process device group calculation unit 34 calculates the probability of malfunction of a process device group that is constituted by one piping system and a plurality of process devices that are provided in the piping system, and, in this embodiment, the process device group calculation unit 34 is configured to calculate the probability of malfunction of the process device group based on the probabilities of malfunction of respective process devices that are calculated by the process device calculation unit 33. For this purpose, the process device group calculation unit 34 includes a calculation method storage unit 341, an individual probability acquisition unit 342, an arrangement relationship acquisition unit 343, and a malfunction probability calculation unit 344 (FIG. 4).

The calculation method storage unit 341 stores calculation methods of the probability of malfunction according to the arrangement relationship between process devices that constitute a process device group. In this embodiment, the calculation method storage unit 341 stores, as the calculation methods, a parallel calculation method for cases where the process devices are in a parallel relationship to each other and a series calculation method for cases where the process devices are in a series relationship to each other. For example, in this embodiment, according to the parallel calculation method, the probability of malfunction of a process device group is calculated by multiplying the probabilities of malfunction of respective process devices that are in a parallel relationship to each other, and according to the series calculation method, the highest probability of malfunction out of the probabilities of malfunction of respective process devices that are in a series relationship to each other is taken to be the probability of malfunction of a process device group.

The individual probability acquisition unit 342 acquires the probabilities (individual probabilities) of malfunction of respective process devices (target process devices) that constitute a target process device group, and, in this embodiment, the individual probability acquisition unit 342 acquires, as the individual probabilities, the probabilities of malfunction of the respective process devices that are calculated by the process device calculation unit 33.

The arrangement relationship acquisition unit 343 acquires a target arrangement relationship that is the arrangement relationship between the target process devices constituting the target process device group. In this embodiment, the arrangement relationship acquisition unit 343 is configured to acquire identification information regarding the target device group from the input/output processing unit 31 and acquire, from the database server 4, identification information regarding each process device group that is included in the device group corresponding to the acquired identification information, identification information regarding each process device that constitutes respective process device groups, and the arrangement relationship between process devices in each process device group. That is, the arrangement relationship acquisition unit 343 is configured to acquire information that indicates which process devices belong to the same process device group out of process devices for which the probabilities of malfunction are acquired by the individual probability acquisition unit 342, and information that indicates the arrangement relationship between the process devices belonging to the same process device group.

The malfunction probability calculation unit 344 calculates the probability of malfunction of the target process device group using the acquired individual probabilities based on a calculation method that corresponds to the target arrangement relationship acquired by the arrangement relationship acquisition unit 343. For example, if the process devices belonging to the target process device group are in a parallel relationship to each other, the malfunction probability calculation unit calculates the probability of malfunction of the target process device group by multiplying the individual probabilities, and if the process devices belonging to the target process device group are in a series relationship to each other, the malfunction probability calculation unit takes the highest individual probability out of the individual probabilities to be the probability of malfunction of the target process device group. For example, when the individual probabilities are represented by $P_1$, $P_2$, and $P_3$, according to the parallel calculation method, the probability of malfunction is $P=(P_1 \times P_2 \times P_3)$, and according to the series calculation method, the probability of malfunction is $P=\max(P_1, P_2, P_3)$.

It should be noted that, as shown in FIG. 9, a process device group may include a group of process devices that are in a parallel relationship to each other (referred to below as a parallel device group, for example, a group constituted by the steam trap 223D and the steam trap 223E shown in FIG. 9) and another target process device (for example, the steam trap 223F shown in FIG. 9) that is not included in the parallel device group, or a process device group may include a plurality of parallel device groups, and in these cases, the probability of malfunction cannot be calculated using only one of the above-described parallel calculation method and series calculation method. Therefore, in this embodiment, if there is such a complicated relationship (a relationship for which the probability of malfunction needs to be calculated by combining the parallel calculation method and the series calculation method), the arrangement relationship acquisition unit 343 identifies, in acquiring the target arrangement relationship, one or more parallel device groups and then identifies the parallel device groups, or the parallel device groups and another target process device, as a series device group, considering each parallel device group as a unit. If there is a complicated relationship, the malfunction probability calculation unit 344 calculates a target malfunction probability by calculating, for each parallel device group, the probability of malfunction of the parallel device group based on the parallel calculation method using the individual probabilities of target process devices that constitute the parallel device group, and calculating the probability of malfunction of the series device group based on the series calculation method using the probabilities of malfunction of respective parallel device groups or the probabilities of malfunction of one or more parallel device groups and the individual probability of another target process device.

For example, in the case of the process device group 224B shown in FIG. 9, the arrangement relationship acquisition unit 343 identifies, in acquiring the target arrangement relationship, the steam trap 223D and the steam trap 223E as a parallel device group, and then identifies the parallel device group and the steam trap 223F as a series device group. When the probabilities of malfunction of the steam traps 223D to 223F are respectively represented by $P_D$, $P_E$, and $P_F$, the malfunction probability calculation unit 344 calculates the probability of malfunction $P_{DE}$ of the parallel device group constituted by the steam traps 223D and 223E using the following formula: $P_{DE}=(P_D \times P_E)$. Further, the malfunction probability calculation unit 344 calculates the probability of malfunction of the process device group 224B by calculating the probability of malfunction $P_{DEF}$ of the series device group constituted by the steam trap 223F and the parallel device group constituted by the steam traps 223D and 223E using the following formula: $P_{DEF}=\max((P_D \times P_E), P_F)$. It should be noted that, if there are a plurality of parallel device groups, the malfunction probability calculation unit 344 calculates the probability of malfunction with respect to each parallel device group, and obtains the probability of malfunction using the series calculation method, based on the calculated probabilities of malfunction of the respective parallel device groups and, if there is a target process device that does not belong to any of the parallel device groups, based on the individual probability of the target process device.

As in the case of the process device group 224A shown in FIG. 9, if there is a parallel device group (steam traps 223A to 223C) and the parallel device group includes one or more groups of target process devices that are in a series relationship to each other (steam traps 223B and 223C, referred to below as a sub series device group), the probability of malfunction cannot be calculated using only one of the parallel calculation method and the series calculation method. Therefore, in this embodiment, if the target process device group includes a parallel device group and one or more sub series device groups, the target arrangement relationship acquisition unit 343 identifies, in acquiring the target arrangement relationship, the parallel device group and the one or more sub series device groups. If there are the parallel device group and the one or more sub series device groups, the malfunction probability calculation unit 344 initially calculates, with respect to each of the one or more sub series device groups, the probability of malfunction based on the series calculation method using the individual probabilities of target process devices that constitute the sub series device group. Then, the malfunction probability calculation unit calculates the probability of malfunction of the parallel device group based on the parallel calculation method using the probabilities of malfunction of the one or more sub series device groups and, if there is a target process device that does not belong to any of the sub series device groups, using the individual probability of the target process device.

For example, in the case of the process device group 224A shown in FIG. 9, the target arrangement relationship acquisition unit 343 identifies, in acquiring the target arrangement relationship, the steam traps 223A to 223C as a parallel device group, and further identifies the steam traps 223B and 223C as a sub series device group. When the probabilities of malfunction of the steam traps 223A to 223C are respectively represented by $P_A$, $P_B$, and $P_C$, the malfunction probability calculation unit 344 calculates the probability of malfunction $P_{BC}$ of the sub series device group constituted by the steam traps 223B and 223C using the following formula: $P_{BC}=\max(P_B, P_C)$. Further, the malfunction probability calculation unit 344 calculates the probability of malfunction of the process device group 224A by calculating the probability of malfunction $P_{ABC}$ of the parallel device group constituted by the steam traps 223A to 223C using the following formula: $P_{ABC}=(P_A \times \max(P_B, P_C))$. It should be noted that, if there is a sub series device group on each of pipes that are in a parallel relationship to each other in a parallel device group, the malfunction probability calculation unit 344 calculates the probability of malfunction with respect to each sub series device group and then calculates the probability of malfunction of the parallel device group based on the parallel calculation method, considering each sub series device group as a unit.

If there is a parallel device group but the performance (capacity or the like) of one of the process devices that constitute the parallel device group does not satisfy the required performance in relation to the steam-utilizing device to which the process device is applied (for example, if the capacity of a steam trap is insufficient relative to the amount of drainage discharged from the steam-utilizing device), the process devices substantially do not function as parallel devices although they are actually in a parallel relationship to each other. Therefore, if there is a parallel device group, the target arrangement relationship acquisition unit 343 determines whether the performance of target process devices constituting the parallel device group satisfies the required performance, and at least when all target process devices that are located on one side of the parallel relationship do not satisfy the required performance, the target arrangement relationship acquisition unit 343 identifies the target arrangement relationship between the target process devices constituting the parallel device group as a series relationship.

For example, in the process device group 224B shown in FIG. 9, if one of the steam trap 223D and the steam trap 223E, which constitute a parallel device group, does not satisfy the required performance in relation to the steam-utilizing device 221, the target arrangement relationship acquisition unit 343 determines that the steam trap 223D and the steam trap 223E constituting the parallel device group are in a series relationship to each other. In this case, all of the steam traps 223D to 223F constituting the process device group 224B are dealt with as being in a series relationship to each other, and the malfunction probability calculation unit 344 calculates the probability of malfunction $P_{DEF}$ of the process device group 224B using the following formula: $P_{DEF}=\max(P_D, P_E, P_F)$. In the process device group 224A shown in FIG. 9, if only the steam trap 223B or the steam trap 223C does not satisfy the required performance out of the steam traps 223A to 223C, the target arrangement relationship acquisition unit 343 determines that the steam traps 223A to 223C are in a parallel relationship, but if both the steam trap 223B and the steam trap 223C do not satisfy the required performance or the steam trap 223A does not satisfy the required performance, all of the steam traps 223A to 223C constituting the process device group 224A are dealt with as being in a series relationship to each other, and the malfunction probability calculation unit 344 calculates the probability of malfunction $P_{ABC}$ of the process device group 224A using the following formula: $P_{ABC}=\max(P_A, P_B, P_C)$.

As described above, in the process device group calculation unit 34, the probability of malfunction is calculated with respect to each target process device group through execution of:

(1) a calculation method storing step of storing calculation methods of the probability of malfunction according to the arrangement relationship between process devices that constitute a process device group;

(2) an individual probability acquisition step of acquiring the individual probability that is the probability of malfunction, with respect to each of target process devices that are the process devices constituting the target process device group;

(3) an arrangement relationship acquisition step of acquiring the target arrangement relationship that is the arrangement relationship between the target process devices constituting the target process device group; and (4) a malfunction probability calculation step of calculating the target malfunction probability that is the probability of malfunction of the target process device group, using the acquired individual probabilities based on a calculation method that corresponds to the target arrangement relationship.

Figure 5:
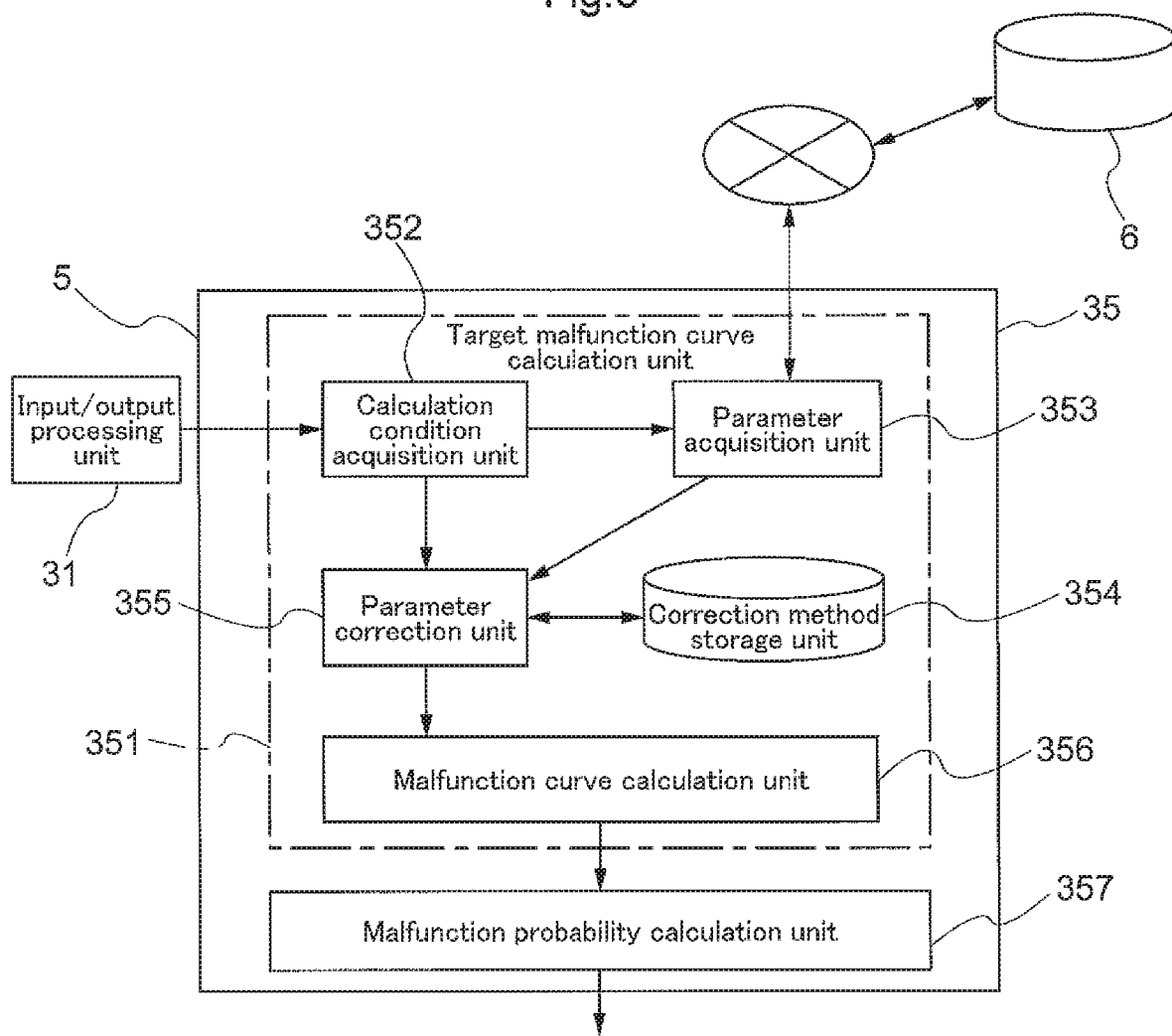
FIG. 5 is a block diagram of a steam-utilizing device calculation unit.

The steam-utilizing device calculation unit 35 calculates the probability of malfunction of a steam-utilizing device that is included in the target device group, and for this purpose, in this embodiment, the steam-utilizing device calculation unit 35 includes a target malfunction curve calculation unit 351 that calculates a target malfunction curve that shows a change of the probability of malfunction over time with respect to the target steam-utilizing device, and a malfunction probability calculation unit 357 that calculates the probability of malfunction of the target steam-utilizing device based on the calculated target malfunction curve (FIG. 5).

In order to calculate the target malfunction curve, the target malfunction curve calculation unit 351 includes a calculation condition acquisition unit 352, a parameter acquisition unit 353, a correction method storage unit 354, a parameter correction unit 355, and a malfunction curve calculation unit 356, and is configured to determine parameters according to the steam-utilizing device for which calculation is to be performed, and calculate the target malfunction curve based on the parameters.

The calculation condition acquisition unit 352 acquires the kind of the target steam-utilizing device, correction items that relate to conditions of use of the steam-utilizing device, the number of years from installation of the steam-utilizing device, and calculation time information regarding the point in time for which the probability of malfunction is to be calculated (for example, whether the probability of malfunction at the current point in time is to be calculated or the probabilities of malfunction over a plurality of years from the current point in time are to be calculated). In this embodiment, the calculation condition acquisition unit 352 is configured to acquire identification information regarding the target device group and the calculation time information from the input/output processing unit 31 and acquire, from the database server 4, identification information regarding the steam-utilizing device that is included in the device group corresponding to the acquired identification information, and the kind of the steam-utilizing device, the correction items, and the number of years from installation that correspond to the identification information regarding the steam-utilizing device. Additionally, if an instruction has been accepted by the input/output processing unit 31 as to the type of malfunction for which the probability is to be calculated, the calculation condition acquisition unit 352 also acquires the type of malfunction for which calculation is to be performed.

The parameter acquisition unit 353 acquires calculation parameters that correspond to the target steam-utilizing device from a database 6 that stores parameters for calculation of the target malfunction curve for each kind of the steam-utilizing device. It is possible to use, as the database 6, a database that stores parameters that are calculated based on data collected by the database server 4, as is the case with the above-described parameter storage unit 332, or a database that is open to the public as a database that stores parameters for calculating a malfunction curve with respect to a steam-utilizing device. In this embodiment, the parameter acquisition unit 353 is configured to acquire, from the database 6, calculation parameters that correspond to the kind of the steam-utilizing device acquired by the calculation condition acquisition unit 352. If the type of malfunction for which calculation is to be performed is acquired by the calculation condition acquisition unit 352, the parameter acquisition unit 353 acquires calculation parameters according to the acquired type of malfunction, and if the type of malfunction is not acquired by the calculation condition acquisition unit 352, the parameter acquisition unit 353 acquires calculation parameters for all types of malfunction.

The correction method storage unit 354 stores, for each kind of the steam-utilizing device, correction items of the steam-utilizing device and correction methods that correspond to the correction items. The correction items employed in this embodiment are items that relate to additional configurations provided to the steam-utilizing device (the presence or absence of an additional configuration such as a steam separator, the number of process devices associated with the steam-utilizing device, etc.); items that relate to the installation state, conditions of use, and the performance of the steam-utilizing device (whether the conditions of use exceed the performance, whether the steam-utilizing is installed where water hammer is likely to occur, the frequency and time of use, etc.); and items that relate to operations performed on the steam-utilizing device (whether the steam-utilizing device has been repaired, when the steam-utilizing device was repaired, the type of repair, the degree of effect of repair, etc.). Although the correction methods are not specifically limited, the calculation parameters are corrected using an appropriate calculation method (for example, by multiplying or dividing) based on values corresponding to respective correction items.

The parameter correction unit 355 corrects the calculation parameters based on a correction method that corresponds to the acquired correction items. The parameter correction unit 355 corrects the calculation parameters regarding the steam-utilizing device based on the correction items according to the actual circumstances of the steam-utilizing device, and therefore calculation parameters according to the actual circumstances of individual steam-utilizing devices can be obtained.

The malfunction curve calculation unit 356 calculates the target malfunction curve based on a predetermined model for calculation of the malfunction curve and the corrected calculation parameters. The model to be used is not specifically limited, and a model similar to that used in the malfunction curve calculation unit 337 can be used. In the case where the probability of malfunction is to be calculated for each type of malfunction, the malfunction curve calculation unit 356 calculates, with respect to the steam-utilizing device, the target malfunction curve for each type of malfunction. It should be noted that the calculated target malfunction curve may be corrected based on items that relate to operations performed on the steam-utilizing device, as is the case with the malfunction curve correction unit 338.

The malfunction probability calculation unit 357 calculates the probability of malfunction of the steam-utilizing device based on the calculated target malfunction curve and the calculation time information acquired by the calculation condition acquisition unit 352. The malfunction probability calculation unit 357 calculates the probability of malfunction similarly to the malfunction probability calculation unit 339, and therefore a description thereof is omitted.

As described above, in the steam-utilizing device calculation unit 35, the probability of malfunction of the target steam-utilizing device is calculated through execution of:

(1) a calculation condition acquisition step of acquiring, with respect to the target steam-utilizing device, the type of the steam-utilizing device, the correction items, and the like;

(2) a parameter acquisition step of acquiring calculation parameters that correspond to the target steam-utilizing device from the database 6;

(3) a parameter correction step of correcting the calculation parameters based on a correction method that corresponds to the acquired correction items;

(4) a malfunction curve calculation step of calculating the target malfunction curve based on the calculation parameters; and (5) a malfunction probability calculation step of calculating the probability of malfunction of the target steam-utilizing device based on the calculated target malfunction curve.

Figure 6:
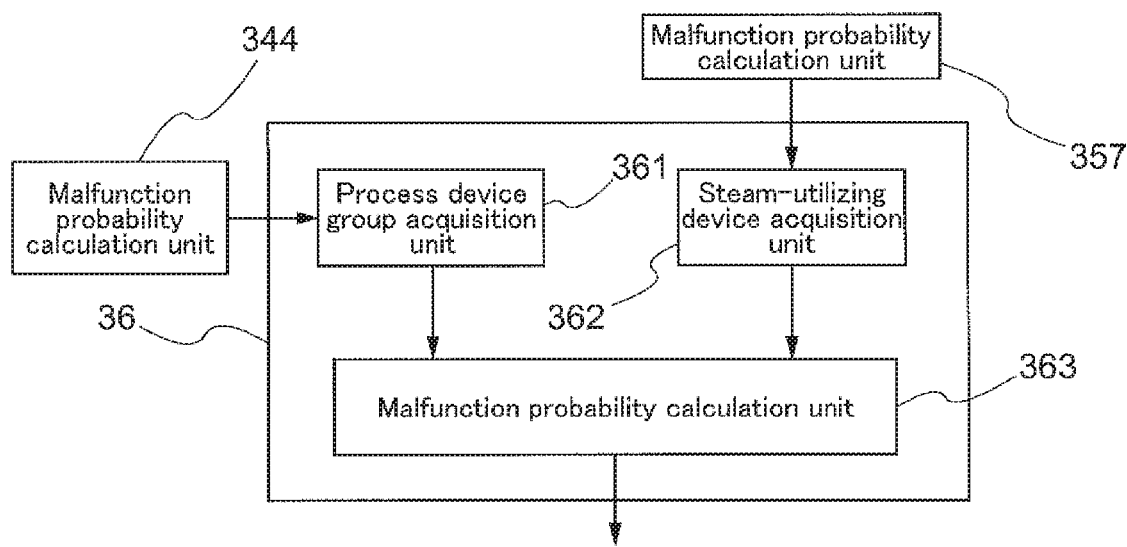
FIG. 6 is a block diagram of a steam-utilizing device group calculation unit.

In order to calculate the probability of malfunction of the target device group (calculation-target device group) such as a steam-utilizing device group that includes a steam-utilizing device that utilizes steam and a plurality of process device groups that are associated with the steam-utilizing device, the calculation-target device group calculation unit (corresponding to a steam-utilizing device group calculation unit) 36 includes a process device group acquisition unit 361 that acquires the probabilities of malfunction of the process device groups, a steam-utilizing device acquisition unit 362 that acquires the probability of malfunction of the steam-utilizing device, and a malfunction probability calculation unit 363 that calculates the probability of malfunction of the calculation-target device group using the acquired probabilities of malfunction of the respective process device groups and the acquired probability of malfunction of the steam-utilizing device (FIG. 6).

The process device group acquisition unit 361 acquires the probabilities of malfunction of the respective process device groups constituting the target device group, which are calculated by the malfunction probability calculation unit 344 of the process device group calculation unit 34. It should be noted that the process device group acquisition unit 361 is configured to acquire, together with the probabilities of malfunction of the respective process device groups, identification information and information that indicates the point in time for which the probabilities of malfunction are calculated. Accordingly, in the case where the probabilities of malfunction of a plurality of device groups are to be calculated or the probabilities of malfunction at a plurality of points in time are to be calculated, it is possible to identify, with respect to each process device group, the calculation-target device group to which the process device group belongs and identify, with respect to each probability of malfunction, the point in time for which the probability is calculated.

The steam-utilizing device acquisition unit 362 acquires the probability of malfunction calculated by the malfunction probability calculation unit 357 of the steam-utilizing device calculation unit 35. Similarly to the process device group acquisition unit 361, the steam-utilizing device acquisition unit 362 is configured to acquire, together with the probability of malfunction of the steam-utilizing device, identification information and information that indicates the point in time for which the probability of malfunction is calculated.

The malfunction probability calculation unit 363 calculates the probability of malfunction of the calculation-target device group using the acquired probabilities of malfunction of the respective process device groups and the acquired probability of malfunction of the steam-utilizing device. If the calculation-target device group is a device group that is used for tracing without a steam-utilizing device, the malfunction probability calculation unit 363 calculates the probability of malfunction of the calculation-target device group using only the probabilities of malfunction of the process device groups. The calculation may be performed by, for example, simply multiplying the probabilities of malfunction of the process device groups by the probability of malfunction of the steam-utilizing device, or, as is the case with the process device group calculation unit 34, determining a calculation method taking the arrangement relationship into consideration and calculating the probability of malfunction using the calculation method according to the arrangement relationship. Further, the calculated probability of malfunction may be corrected using items that relate to individual circumstances of the calculation-target device group. In the case where the probabilities of malfunction of a plurality of calculation-target device groups are to be calculated, the probability of malfunction can be calculated for each calculation-target device group by identifying process device groups and a steam-utilizing device that belong to the same calculation-target device group based on identification information, and using the probabilities of malfunction of the process device groups and the steam-utilizing device belonging to the same calculation-target device group. In the case where the probabilities of malfunction at a plurality of points in time are to be calculated, the probability of malfunction can be calculated for each point in time by combining the probabilities of malfunction at the same point in time.

As described above, in the malfunction probability calculation processing unit 32, the probability of malfunction is calculated with respect to each process device, each process device group, each steam-utilizing device, and each calculation-target device group, and, in response to an instruction from the input/output processing unit 31, the probabilities of malfunction of respective process devices, respective process device groups, respective steam-utilizing devices, and respective calculation-target device groups are transmitted to the display image calculation processing unit 38 together with identification information, the type of malfunction, and information that indicates the point in time for which the probabilities of malfunction are calculated.

The influence degree calculation processing unit 37 calculates the degree of influence of the calculation-target device group or each constituent element, and includes a calculation condition acquisition unit 371, an influence degree storage unit 372, an influence degree acquisition unit 373, and an influence degree calculation unit 374.

The calculation condition acquisition unit 371 acquires the kind and/or type of each process device and/or each steam-utilizing device that constitute the calculation-target device group. In this embodiment, the calculation condition acquisition unit 371 is configured to acquire identification information regarding the target device group from the input/output processing unit 31 and acquire, from the database server 4, identification information regarding each process device and/or each steam-utilizing device that are included in the device group corresponding to the acquired identification information, and the kind and/or type of each process device and/or each steam-utilizing device that correspond to identification information thereof. Additionally, if an instruction has been accepted by the input/output processing unit 31 as to the type of malfunction for which the probability is to be calculated, the calculation condition acquisition unit 371 also acquires the type of malfunction for which calculation is to be performed. Further, if a determination item (for example, the presence or absence of a device configuration that can reduce or avoid damage due to malfunction) for acquiring the degree of influence is specified by the influence degree acquisition unit 373, the calculation condition acquisition unit 371 also acquires the determination item with respect to each process device and/or each steam-utilizing device.

The influence degree storage unit 372 stores degrees of influence that correspond to respective categories and/or types of process devices and/or steam-utilizing devices and respective types of malfunction. For each kind and/or each type of process devices and/or steam-utilizing devices, the degrees of influence may be classified based on a predetermined determination item, and different values that indicate different degrees of influence may be stored according to the presence or absence of the determination item.

The influence degree acquisition unit 373 acquires, from the influence degree storage unit 372, degrees of influence that correspond to the categories and/or types of respective process devices and/or respective steam-utilizing devices, which are acquired by the calculation condition acquisition unit 371. If a determination item is also acquired by the calculation condition acquisition unit 371, the influence degree acquisition unit 373 acquires, from the influence degree storage unit 372, degrees of influence that correspond to the categories and/or types of the respective process devices and/or the respective steam-utilizing devices and the determination item. If the type of malfunction for which calculation is to be performed is also acquired by the calculation condition acquisition unit 371, the influence degree acquisition unit 373 acquires the degrees of influence according to the acquired type of malfunction, and if the type of malfunction is not acquired by the calculation condition acquisition unit 371, the influence degree acquisition unit 373 acquires degrees of influence for all types of malfunction.

The influence degree calculation unit 374 calculates the degree of influence of a process device group and/or the calculation-target device group by combining the degrees of influence of the respective process devices and/or the respective steam-utilizing devices acquired by the influence degree acquisition unit 373, using a predetermined calculation method. The calculation may be performed by simply adding the degrees of influence or according to a predetermined model.

As described above, in the influence degree calculation processing unit 37, the degree of influence is determined with respect to each process device, each process device group, each steam-utilizing device, and each calculation-target device group, and, in response to an instruction from the input/output processing unit 31, the degrees of influence of respective process devices, respective process device groups, respective steam-utilizing devices, and respective calculation-target device groups are transmitted to the display image calculation processing unit 38 together with identification information and the type of malfunction.

The display image calculation processing unit 38 includes a malfunction probability acquisition unit 381 that acquires the probability of malfunction of the target device group and/or each constituent element, an influence degree acquisition unit 382 that acquires the degree of influence that corresponds to the target device group and/or each constituent element, a mode switching unit 383 that is capable of switching the display mode of image data, and an image data creation unit 384 that creates image data, and the display image calculation processing unit creates image data for displaying a plot diagram that is obtained by plotting a pair (i.e., a risk) of the probability of malfunction acquired by the malfunction probability acquisition unit 381 and the degree of influence acquired by the influence degree acquisition unit 382 on a risk matrix in which the probability of malfunction and the degree of influence of malfunction are set as two axes.

First, the mode switching unit 383 will be described. The mode switching unit 383 switches the image data creation unit 384 between a plurality of modes in which created image data is displayed in different modes. The modes that can be set by the mode switching unit 383 include the following three modes that relate to the display target: a calculation-target device group unit mode for creating display data for displaying a plot diagram that is obtained by performing plotting for each calculation-target device group; a process device group unit mode for creating display data for displaying a plot diagram that is obtained by performing plotting for each process device group; and a constituent element unit mode for creating display data for displaying a plot diagram that is obtained by performing plotting for each constituent element that constitutes a device group, and the modes that can be set further includes, as options of these three modes: a temporal change display mode for creating display data for displaying a plot diagram that is obtained by plotting a temporal change of the risk; an improvement effect display mode for creating display data for displaying improvement items together with a plot diagram and displaying a plot diagram that is obtained by plotting the risk after a selected improvement item is improved; and a reference line display mode for displaying a plot diagram on which a reference line for understanding risks is superimposed. The mode switching unit 383 is configured to switch the mode of the image data creation unit 384 in response to an instruction from the input/output processing unit 31.

The malfunction probability acquisition unit 381 acquires probabilities of malfunction that are necessary out of the probabilities of malfunction of respective process devices, respective process device groups, respective steam-utilizing devices, and respective calculation-target device groups, which are calculated by the malfunction probability calculation processing unit 32. Specifically, the malfunction probability acquisition unit 381 acquires, in the calculation-target device group unit mode, the probability of malfunction (hereinafter referred to as a whole malfunction probability) of each calculation-target device group, acquires, in the process device group unit mode, the probability of malfunction (hereinafter referred to as an intermediate malfunction probability) of each process device group in addition to or instead of the whole malfunction probability, and acquires, in the constituent element unit mode, the probability of malfunction (hereinafter referred to as an individual malfunction probability) of each element (each process device and each steam-utilizing device) that constitutes the calculation-target device group in addition to or instead of the whole malfunction probability and the intermediate malfunction probability.

In the temporal change display mode, the malfunction probability acquisition unit 381 acquires a data group (probabilities of malfunction at a plurality of points in time) that indicates a temporal change of the probability of malfunction from the current point in time, with respect to the target device group or each constituent element. That is, if the temporal change display mode is set, the malfunction probability acquisition unit 381 acquires, in the calculation-target device group unit mode, a whole data group that is a data group regarding the whole calculation-target device group (i.e., a data group that indicates a temporal change of the whole malfunction probability), acquires, in the process device group unit mode, an intermediate data group that is a data group regarding each process device group (i.e., a data group that indicates a temporal change of each intermediate malfunction probability) in addition to or instead of the whole data group, and acquires an individual data group that is a data group regarding each element (each process device and/or each steam-utilizing device) constituting the calculation-target device group (i.e., a data group that indicates a temporal change of each individual malfunction probability) in addition to or instead of the whole data group and the intermediate data group. It should be noted that the probabilities of malfunction that are acquired as a data group are each associated with information that indicates the point in time for which the probability is calculated.

The malfunction probability acquisition unit 381 is configured to acquire the probabilities of malfunction of respective process devices, respective process device groups, respective steam-utilizing devices, and respective calculation-target device groups (or the above-described data groups) for each type of malfunction, in response to an instruction from the input/output processing unit 31.

The influence degree acquisition unit 382 acquires degrees of influence that are necessary out of the degrees of influence of respective process devices, respective process device groups, respective steam-utilizing devices, and respective calculation-target device groups, which are calculated by the influence degree calculation processing unit 37. Similarly to the malfunction probability acquisition unit 381, the influence degree acquisition unit 382 acquires, in the calculation-target device group unit mode, the degree of influence (hereinafter referred to as a whole influence degree) of each calculation-target device group, acquires, in the process device group unit mode, the degree of influence (hereinafter referred to as an intermediate influence degree) of each process device group in addition to or instead of the whole influence degree, and acquires, in the constituent element unit mode, the degree of influence (hereinafter referred to as an individual influence degree) of each element (each process device and/or each steam-utilizing device) constituting the calculation-target device group in addition to or instead of the whole influence degree and the intermediate influence degree.

The influence degree acquisition unit 382 is configured to acquire the degrees of influence of respective process devices, respective process device groups, respective steam-utilizing devices, and respective calculation-target device groups for each type of malfunction, in response to an instruction from the input/output processing unit 31.

It should be noted that the malfunction probability acquisition unit 381 and the influence degree acquisition unit 382 acquire, together with the probabilities of malfunction (and data groups) and the degrees of influence, identification information regarding corresponding process devices, process device groups, steam-utilizing devices, or calculation-target device groups, and the type of malfunction, and the image data creation unit 384 is capable of creating a pair of the probability of malfunction and the degree of influence that are associated with the same identification information and the same type of malfunction.

The image data creation unit 384 creates image data for displaying plot diagrams that are obtained by plotting pairs of acquired probabilities of malfunction and acquired degrees of influence on a risk matrix, as shown in FIGS. 10 to 13. Specifically, the image data creation unit 384 creates, in the calculation-target device group unit mode, image data for displaying a plot diagram that is obtained by plotting each pair of an acquired whole malfunction probability and an acquired whole influence degree on the risk matrix (see FIGS. 10 and 12), creates, in the process device group unit mode, image data for displaying a plot diagram that is obtained by plotting each pair of an acquired intermediate malfunction probability and an acquired intermediate influence degree on the risk matrix, together with or instead of the pair of the acquired whole malfunction probability and the acquired whole influence degree, and creates, in the constituent element unit mode, image data for displaying a plot diagram that is obtained by plotting each pair of an acquired individual malfunction probability and an acquired individual influence degree on the risk matrix (see FIGS. 11 and 13), together with or instead of the pair of the acquired whole malfunction probability and the acquired whole influence degree and the pair of the acquired intermediate malfunction probability and the acquired intermediate influence degree.

Figure 10:
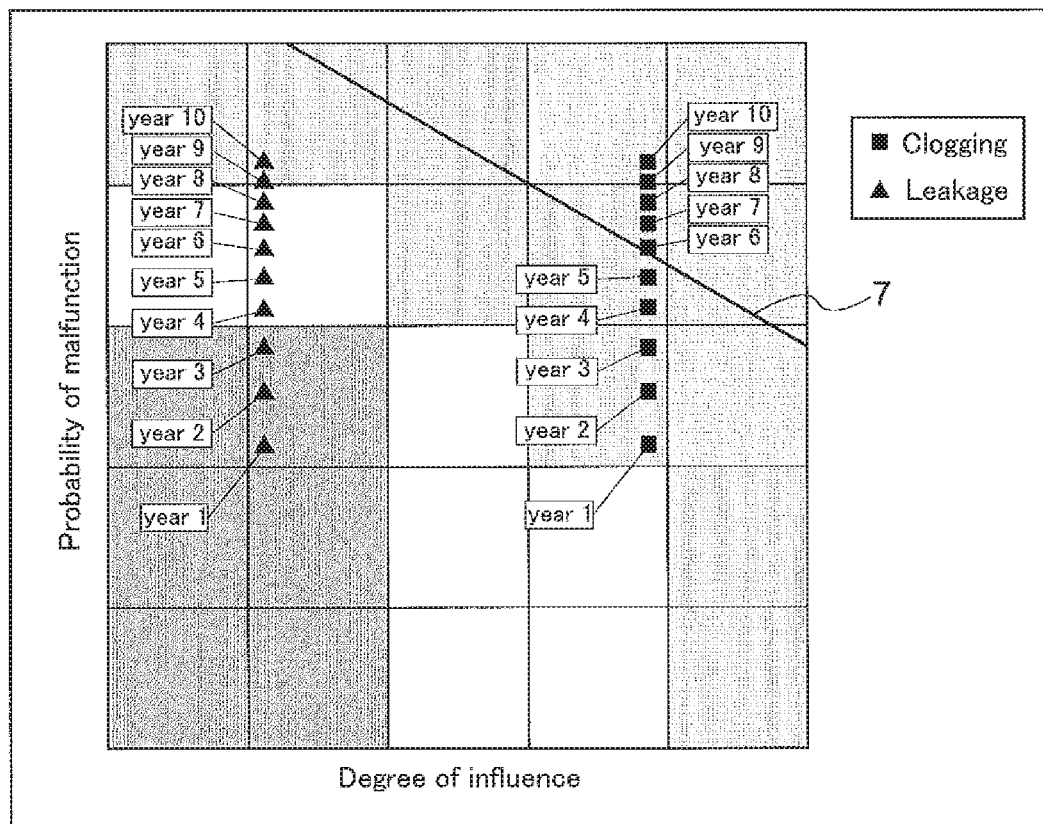
FIG. 10 is a diagram illustrating one example of a risk matrix.
Figure 11:
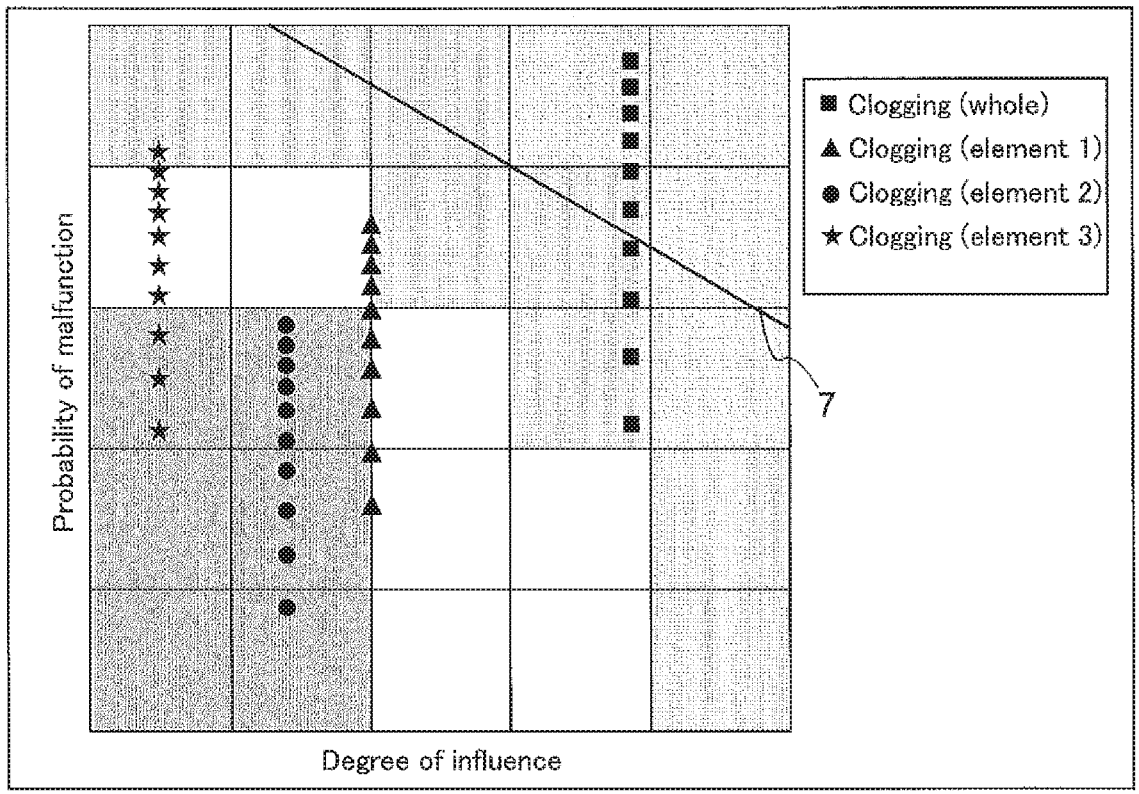
FIG. 11 is a diagram illustrating one example of a risk matrix.

In the temporal change display mode, the image data creation unit 384 creates image data for displaying a plot diagram that is obtained by plotting, with respect to each probability of malfunction that constitutes the acquired data group (whole data group, intermediate data group, or individual data group), a pair of the probability of malfunction and the acquired degree of influence on the risk matrix, according to which mode is set out of the calculation-target device group unit mode, the process device group unit mode, and the constituent element unit mode. For example, in the calculation-target device group unit mode, the image data creation unit 384 creates image data for displaying a plot diagram that is obtained by plotting, with respect to each probability of malfunction that constitutes the acquired whole data group, a pair of the probability of malfunction and the whole influence degree, on the risk matrix as shown in FIG. 10. In the constituent element unit mode, the image data creation unit 384 creates image data for displaying a plot diagram that is obtained by plotting, for each of acquired individual data groups, with respect to each probability of malfunction that constitutes the individual data group, a pair of the probability of malfunction and the individual influence degree that corresponds to the individual data group, on the risk matrix together with or instead of the pair of the whole data group and the whole influence degree, as shown in FIG. 11.

As described above, in the temporal change display mode, the following steps are performed in the display image calculation processing unit 38 to display a temporal change of risks to the user:
(1) a malfunction probability acquisition step of acquiring, with respect to the calculation-target device group, a data group that indicates a temporal change of the probability of malfunction from the current point in time;
(2) an influence degree acquisition step of acquiring a degree of influence that corresponds to the calculation-target device group; and
(3) an image data creation step of creating image data for displaying a plot diagram that is obtained by plotting, with respect to each probability of malfunction that constitutes the acquired data group, a pair of the probability of malfunction and the acquired degree of influence on the risk matrix.

Figure 12:
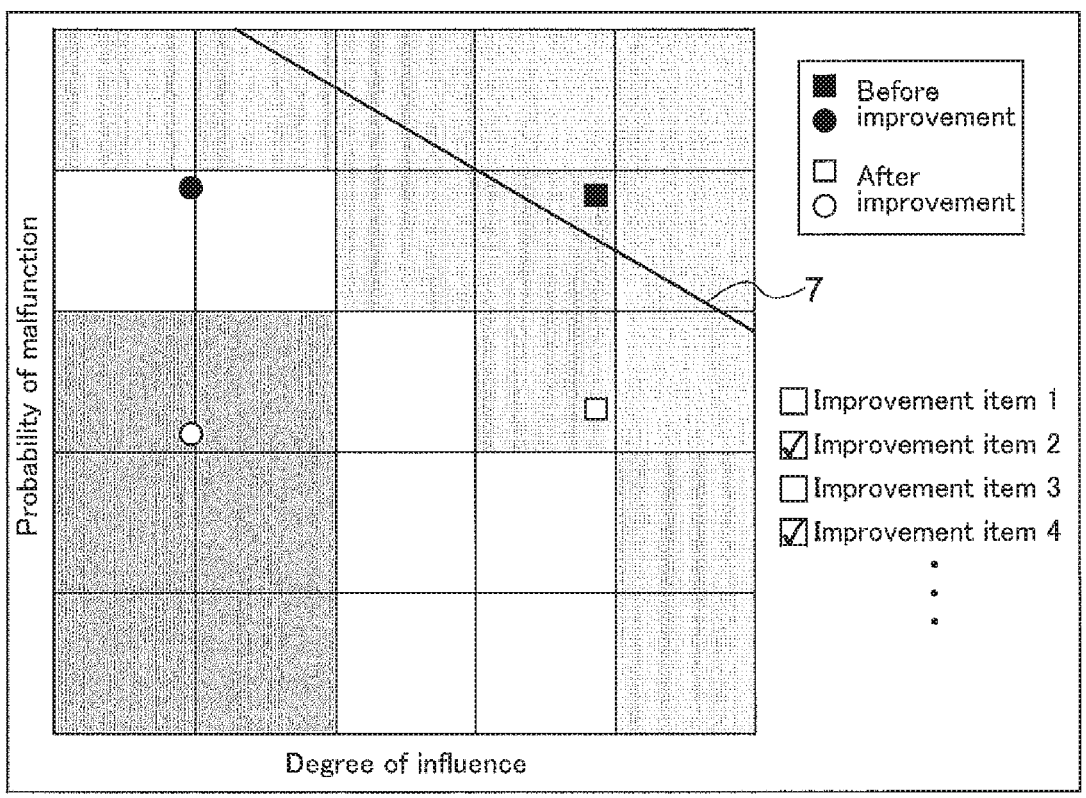
FIG. 12 is a diagram illustrating one example of a risk matrix.
Figure 13:
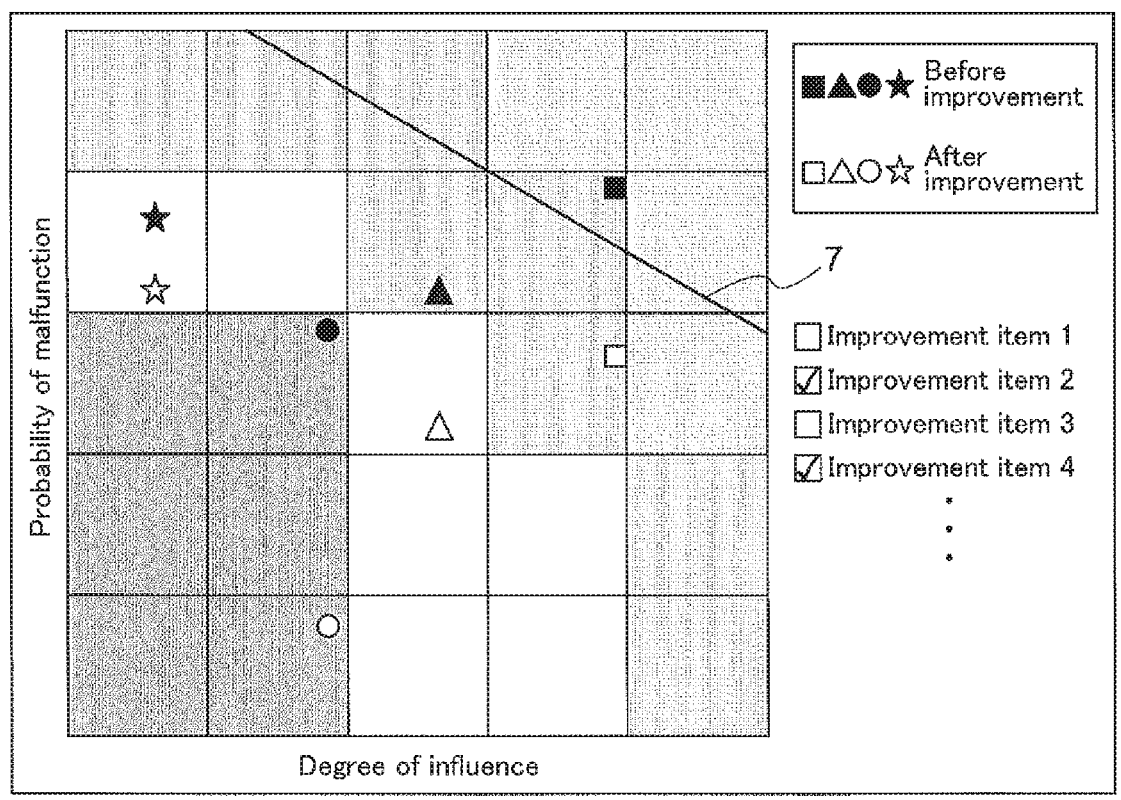
FIG. 13 is a diagram illustrating one example of a risk matrix.

In the improvement effect display mode, the image data creation unit 384 creates image data for displaying a field in which improvement items regarding the calculation-target device group are shown, together with a plot diagram as shown in FIGS. 12 and 13. In this embodiment, the improvement items correspond to the above-described device-related items and operation-related items that relate to process devices, and correction items that relate to steam-utilizing devices, and when one or more improvement items are selected by the user, the selected improvement items (i.e., corresponding device-related items, operation-related items, or correction items) are acquired by the input/output processing unit 31 (i.e., the input/output processing unit 31 functions as an improvement item acquisition unit that acquires improvement items).

If an improvement item is acquired by the input/output processing unit 31, a device-related item, an operation-related item, or a correction item that corresponds to the acquired improvement item is acquired by the malfunction probability calculation processing unit 32 (calculation condition acquisition unit 333 or 352), and the parameter correction unit 336 or 355 or the malfunction curve correction unit 338 corrects a calculation parameter and/or a malfunction curve assuming that the target process device and/or the steam-utilizing device has the acquired device-related item, operation-related item, or correction item. Then, the malfunction probability calculation processing unit 32 recalculates the probability of malfunction with respect to each process device, each process device group, each steam-utilizing device, and each calculation-target device group based on the corrected calculation parameter or the corrected malfunction curve, and transmits, to the malfunction probability acquisition unit 381, calculation results as post-improvement probabilities of malfunction that are the probabilities of malfunction regarding the device group (respective process devices, respective process device groups, respective steam-utilizing devices, and respective calculation-target device groups) after the improvement item is improved.

The malfunction probability acquisition unit 381 acquires the transmitted post-improvement probabilities of malfunction, and the image data creation unit 384 creates, based on the acquired post-improvement probabilities of malfunction, image data for displaying a plot diagram that is obtained by plotting pairs of the acquired post-improvement probabilities of malfunction and the degrees of influence on the risk matrix, together with or instead of the displayed pairs of the probabilities of malfunction and the degrees of influence.

As described above, in the improvement effect display mode, the following steps are performed in the display image calculation processing unit 38 to show the change of risks before and after improvement:

(1) a malfunction probability acquisition step of acquiring probabilities of malfunction regarding the calculation-target device group;

(2) an influence degree acquisition step of acquiring degrees of influence that correspond to the calculation-target device group;

(3) an image data creation step of creating image data for displaying a plot diagram that is obtained by plotting pairs of the acquired probabilities of malfunction and the acquired degrees of influence on a risk matrix;

(4) an improvement item acquisition step of acquiring an improvement item regarding the calculation-target device group; and (5) a post-improvement image data creation step of, upon acquisition of the improvement item in the improvement item acquisition step, acquiring post-improvement probabilities of malfunction that are the probabilities of malfunction regarding the device group after the improvement item is improved, and creating image data for displaying a plot diagram that is obtained by plotting pairs of the acquired post-improvement probabilities of malfunction and the degrees of influence on the risk matrix, together with or instead of the pairs of the acquired probabilities of malfunction and the acquired degrees of influence.

In the case where plotting is to be performed for each type of malfunction, the image data creation unit 384 creates image data for displaying a plot diagram that is obtained by plotting, for each type (leakage, clogging, etc.) of malfunction, a pair of the acquired probability of malfunction (in the temporal change display mode, each probability of malfunction that constitutes the acquired data group) and a corresponding degree of influence on the risk matrix as shown in FIGS. 10 and 12.

Further, the image data creation unit 384 is configured to create, in the reference line display mode, image data for displaying a plot diagram on which a reference line 7 for understanding risks is superimposed as shown in FIGS. 10 to 13. In this case, the plot diagram is displayed together with the reference line 7 that serves as an indicator, and it is possible to visually recognize the region above the reference line 7 as being a high-risk region and the region below the reference line 7 as not being a high-risk region, for example, and risk assessment is facilitated.

As described above, in the monitoring server 3 that functions as the risk assessment device, in response to an instruction from the user terminal 1, the probability of malfunction and the degree of influence are calculated with respect to corresponding process devices, process device groups, steam-utilizing devices, and calculation-target device groups, and pairs of the calculated probabilities of malfunction and the calculated degrees of influence are displayed, on a plot diagram, as risks of the process devices, process device groups, steam-utilizing devices, and calculation-target device groups for which calculation is performed. The monitoring server 3 (i.e., the risk assessment device, the risk assessment method, and the risk assessment program) of this embodiment has the following advantages.

First, the probability of malfunction of a process device is calculated using a malfunction curve that is based on parameters that are calculated using data regarding a large number of process devices, and in particular, the parameters that are calculated relate to the piping system-related items that directly relate to the way the process device is used and largely affect the probability of malfunction, and therefore the probability of malfunction according to characteristics of the process device can be obtained. Since not all information regarding the process device, but rather objective items relating to the piping system and not relating to the circumstances of the process device itself are used, the same type of data can be easily collected and it is possible to increase the accuracy of calculated parameters. Furthermore, parameters that are determined based on the piping system-related items, which are objective items regarding the process device, are further corrected based on the device-related items and the operation-related items, which are subjective items relating to the process device itself, and therefore the accuracy of the parameters can be effectively increased and the probability of malfunction can be accurately calculated.

In the malfunction probability calculation processing unit 32, not only the probabilities of malfunction of individual process devices but also the probability of malfunction of a group constituted by a plurality of devices, such as a process device group or a steam-utilizing device group, is calculated using a predetermined calculation method. Therefore, risk assessment can be performed on not only individual devices but also a device group (asset).

The display image calculation processing unit 38 is configured to be capable of showing a temporal change of the risk of the target device group (asset) on a risk matrix. Therefore, the user can assess future risks. Furthermore, the plot diagram to be displayed can be switched between a plot diagram obtained by performing plotting for each device group and a plot diagram obtained by performing plotting for each constituent element, and if plotting is performed for each device group, it is possible to assess future risks of the whole device group, and if plotting is performed for each constituent element, it is possible to assess risks of individual elements. If temporal changes of the risks of individual elements are shown together with a temporal change of the risk of the whole device group, it is possible to obtain information that indicates which element of the device group particularly contributes to the temporal change of the risk of the whole device group.

The display image calculation processing unit 38 is configured to show the change of the risks before and after improvement to the user, and therefore the user can determine the necessity of improvement. Furthermore, the plot diagram to be displayed can be switched between a plot diagram obtained by performing plotting for each device group and a plot diagram obtained by performing plotting for each constituent element, and the effect of improvement can be shown with respect to individual elements, and therefore the degrees of risks inherent in the individual elements can be assessed more properly.

Other Embodiments

Finally, other embodiments of the risk assessment device, the risk assessment method, and the risk assessment program according to the present disclosure will be described. It should be noted that configurations disclosed in the following embodiments are also applicable in combination with configurations disclosed in other embodiments so long as no contradiction is incurred.

(1) In the above-described embodiment, a configuration is described as an example in which the calculation condition acquisition units 333, 352, and 371 and the arrangement relationship acquisition unit 343 acquire identification information from the input/output processing unit 31 and acquire calculation conditions corresponding to the identification information from the database server 4. However, embodiments of the present disclosure are not limited to this configuration, and the calculation conditions may be directly acquired from the input/output processing unit 31, for example.

(2) In the above-described embodiment, a configuration is described as an example in which the process device calculation unit 33 and the steam-utilizing device calculation unit 35 correct the calculation parameters and the malfunction curve through the parameter correction units 336 and 355 and the malfunction curve correction unit 338. However, embodiments of the present disclosure are not limited to this configuration, and a configuration is also possible in which the malfunction curve is calculated without the calculation parameters acquired by the parameter acquisition unit 334 being corrected, or the calculated malfunction curve is not corrected.

(3) In the above-described embodiment, a configuration is described as an example in which the malfunction probability calculation processing unit 32 is capable of calculating the probability of malfunction for each process device, each process device group, each steam-utilizing device, and each calculation-target device group. However, embodiments of the present disclosure are not limited to this configuration, and the malfunction probability calculation processing unit 32 may be configured to calculate the probability of malfunction for only some of process devices, process device groups, steam-utilizing devices, and calculation-target device groups.

(4) In the above-described embodiment, a configuration is described as an example in which the process device group calculation unit 34 calculates the probability of malfunction of a process device group based on the probabilities of malfunction calculated by the process device calculation unit 33. However, embodiments of the present disclosure are not limited to this configuration, and various configurations can be employed for acquiring the probability of malfunction of a process device by the process device group calculation unit 34, for example, a configuration is also possible in which the process device group calculation unit acquires the probability of malfunction that is directly input by the user or acquires a value that is stored in a database in advance. Similarly, various configurations can be employed for acquiring the necessary probabilities of malfunction by the calculation-target device group calculation unit 36 and the malfunction probability acquisition unit 381, and acquiring the necessary degrees of influence by the influence degree acquisition unit 382.

(5) The above-described device-related items, operation-related items, and correction items are merely examples and can be changed as appropriate according to the purpose.

(6) The calculation methods described with respect to the process device group calculation unit 34 in the above embodiment are merely examples and can be changed as appropriate according to the purpose.

(7) In the above-described embodiment, a configuration is described as an example in which the image data creation unit 384 can be set to the calculation-target device group unit mode, the process device group unit mode, the constituent element unit mode, the temporal change display mode, the improvement effect display mode, and the reference line display mode. However, embodiments of the present disclosure are not limited to this configuration, and a configuration is also possible in which the image data creation unit can be set to only some of these modes.

(8) In the above-described embodiment, a configuration is described as an example in which, through execution of the risk assessment program, the monitoring server 3 is configured to include the malfunction probability calculation processing unit 32, the influence degree calculation processing unit 37, and the display image calculation processing unit 38. However, embodiments of the present disclosure are not limited to this configuration. For example, a configuration is also possible in which the above-described risk assessment program or a part of the program is stored in the user terminal 1, and the user terminal 1 is configured to include all or some of the malfunction probability calculation processing unit 32, the influence degree calculation processing unit 37, and the display image calculation processing unit 38. For example, the user terminal 1 may include the display image calculation processing unit 38 and acquire the probability of malfunction and/or the degree of influence from the monitoring server 3.

(9) In the above-described embodiment, a configuration is described as an example in which the monitoring server 3 acquires necessary data from the external database server 4. However, embodiments of the present disclosure are not limited to this configuration, and necessary data may be stored in a storage unit of the monitoring server 3.

(10) Regarding other configurations, the embodiment disclosed in the present description is a mere example in all respects, and it should be understood that the scope of the present disclosure is not limited by the embodiment. It should be easy for a person skilled in the art to understand that it is possible to apply modifications as appropriate without departing from the spirit of the present disclosure. Therefore, as a matter of course, other embodiments that are modified without departing from the spirit of the present disclosure are included in the scope of the present disclosure.

INDUSTRIAL APPLICABILITY

The present disclosure is applicable to risk assessment of a plant, for example.

DESCRIPTION OF REFERENCE SIGNS

3: Monitoring server (Risk assessment device)
31: Input/output processing unit
32: Malfunction probability calculation processing unit
33: Process device calculation unit
331: Target malfunction curve calculation unit
332a: Parameter calculation unit
332b: Parameter saving unit
333: Calculation condition acquisition unit
334: Parameter acquisition unit
335: Correction method storage unit
336: Parameter correction unit
337: Malfunction curve calculation unit
338: Malfunction probability calculation unit
34: Process device group calculation unit
341: Calculation method storage unit
342: Individual probability acquisition unit
343: Arrangement relationship acquisition unit
344: Malfunction probability calculation unit
35: Steam-utilizing device calculation unit
351: Target malfunction curve calculation unit
352: Calculation condition acquisition unit
353: Parameter acquisition unit
354: Correction method storage unit
355: Parameter correction unit
356: Malfunction curve calculation unit
357: Malfunction probability calculation unit
36: Steam-utilizing device group calculation unit
361: Process device group acquisition unit
362: Steam-utilizing device acquisition unit
363: Malfunction probability calculation unit
37: Influence degree calculation processing unit
371: Calculation condition acquisition unit
372: Influence degree acquisition unit
373: Influence degree storage unit
374: Influence degree calculation unit
38: Display image calculation processing unit
381: Malfunction probability acquisition unit
382: Influence degree acquisition unit
383: Mode switching unit
384: Image data creation unit
7: Reference line

The invention claimed is:

1. A risk assessment device for calculating a probability of malfunction of a process device that is provided in a piping system of a steam plant, the risk assessment device comprising:

a target malfunction curve calculation unit configured to calculate a target malfunction curve that shows a change of the probability of malfunction over time with respect to a target process device; and a malfunction probability calculation unit configured to calculate the probability of malfunction of the target process device based on the calculated target malfunction curve, wherein the target malfunction curve calculation unit includes:

a parameter storage unit that calculates, based on data for calculation, one or more parameters for calculating the target malfunction curve and stores the calculated parameters, the parameters relating to piping system-related items, the data for calculation being stored in a storage unit in which the piping system-related items and a number of years passed before malfunction are stored as the data for calculation with respect to each of a plurality, of process devices, and the piping system-related items relating to a piping system in which the process device is provided;

a calculation condition acquisition unit that acquires the piping system-related items with respect to the target process device and device-related items that relate to the target process device itself;

a parameter acquisition unit that acquires a calculation parameter for obtaining the target malfunction curve based on the piping system-related items acquired with respect to the target process device and the parameters stored in the parameter storage unit;

a correction method storage unit that stores a correction method that corresponds to the device-related items;

a parameter correction unit that corrects the calculation parameter acquired by the parameter acquisition unit based on the correction method corresponding to the acquired device-related items; and a malfunction curve calculation unit that calculates the target malfunction curve based on the calculation parameter corrected by the parameter correction unit.

2. The risk assessment device according to claim 1, wherein the parameter storage unit calculates the one or more parameters for calculating the target malfunction curve by performing survival time analysis based on the piping system-related items and the number of years passed before malfunction of each process device, and assessing influence of the piping system-related items on the number of years passed before malfunction.

3. The risk assessment device according to claim 1, wherein the piping system-related items include an item that relates to a usage state of the piping system.

4. The risk assessment device according to claim 1, wherein the device-related items include an item that relates to an additional configuration that is provided to the target process device.

5. The risk assessment device according to claim 1, wherein the device-related items include at least one of an item that relates to an installation state of the target process device in relation to the piping system and an item that relates to performance of the target process device in relation to the piping system.

6. The risk assessment device according to claim 1, wherein the calculation condition acquisition unit acquires operation-related items that relate to operations performed on the target process device, the target malfunction curve calculation unit includes a malfunction curve correction unit that corrects, based on the operation-related items, the target malfunction curve calculated by the malfunction curve calculation unit, and the malfunction probability calculation unit calculates the probability of malfunction of the target process device based on the target malfunction curve corrected by the malfunction curve correction unit.

7. The risk assessment device according to claim 1, wherein, with respect to the target process device, the target malfunction curve calculation unit calculates a target malfunction curve for each type of malfunction of a plurality of types of malfunction, and the malfunction probability calculation unit calculates the probability of malfunction of the target process device for each type of malfunction of the plurality of types of malfunction based on the calculated target malfunction curve for that type of malfunction.

8. A risk assessment method for causing a computer to calculate a probability of malfunction of a process device that is provided in a piping system of a steam plant, the risk assessment method comprising:

a target malfunction curve calculation step of calculating a target malfunction curve that shows a change of the probability of malfunction over time with respect to a target process device; and a malfunction probability calculation step of calculating the probability of malfunction of the target process device based on the calculated target malfunction curve, wherein the target malfunction curve calculation step includes:

a parameter storing step of calculating, based on data for calculation, one or more parameters for calculating the target malfunction curve and storing the calculated parameters, the parameters relating to piping system-related items, the data for calculation being stored in a storage unit in which the piping system-related items and a number of years passed before malfunction are stored as the data for calculation with respect to each of a plurality of process devices, and the piping system-related items relating to a piping system in which the process device is provided;

a calculation condition acquisition step of acquiring the piping system-related items with respect to the target process device and device-related items that relate to the target process device itself;

a parameter acquisition step of acquiring a calculation parameter for obtaining the target malfunction curve based on the piping system-related items acquired with respect to the target process device and the parameters stored in the parameter storing step;

a correction method storage step of storing a correction method that corresponds to the device-related items;

a parameter correction step of correcting the calculation parameter acquired in the parameter acquisition step based on the correction method corresponding to the acquired device-related items; and a malfunction curve calculation step of calculating the target malfunction curve based on the calculation parameter corrected in the parameter correction step.

9. A computer program product comprising at least one non-transitory computer-readable medium including a risk assessment program for causing a computer to calculate a probability of malfunction of a process device that is provided in a piping system of a steam plant, the risk assessment program, when executed by at least one processor, causing the at least one processor to realize:

a target malfunction curve calculation function of calculating a target malfunction curve that shows a change of the probability of malfunction over time with respect to a target process device; and a malfunction probability calculation function of calculating the probability of malfunction of the target process device based on the calculated target malfunction curve, wherein the target malfunction curve calculation function causes the computer to realize:

a parameter storing function of calculating, based on data for calculation, one or more parameters for calculating the target malfunction curve and storing the calculated parameters, the parameters relating to piping system-related items, the data for calculation being stored in a storage unit in which the piping system-related items and a number of years passed before malfunction are stored as the data for calculation with respect to each of a plurality of process devices, and the piping system-related items relating to a piping system in which the process device is provided;

a calculation condition acquisition function of acquiring the piping system-related items with respect to the target process device and device-related items that relate to the target process device itself;

a parameter acquisition function of acquiring a calculation parameter for obtaining the target malfunction curve based on the piping system-related items acquired with respect to the target process device and the parameters stored by the parameter storage function;

a correction method storage function of storing a correction method that corresponds to the device-related items;

a parameter correction function of correcting the calculation parameter acquired by the parameter acquisition unit based on the correction method corresponding to the acquired device-related items; and a malfunction curve calculation function of calculating the target malfunction curve based on the calculation parameter corrected by the parameter correction function.

* * * * *

UNITED STATES PATENT AND TRADEMARK OFFICE
CERTIFICATE OF CORRECTION

| | | |
|---|---|---|
| PATENT NO. | : 10,670,498 B2 | Page 1 of 1 |
| APPLICATION NO. | : 16/495862 | |
| DATED | : June 2, 2020 | |
| INVENTOR(S) | : Tetsuya Mita et al. | |

It is certified that error appears in the above-identified patent and that said Letters Patent is hereby corrected as shown below:

Column 30, Line 19, Claim 1, delete "plurality," and insert -- plurality --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*